United States Patent
Lee et al.

(10) Patent No.: US 7,160,176 B2
(45) Date of Patent: Jan. 9, 2007

(54) METHODS AND APPARATUS FOR ELECTRICALLY AND/OR CHEMICALLY-MECHANICALLY REMOVING CONDUCTIVE MATERIAL FROM A MICROELECTRONIC SUBSTRATE

(75) Inventors: Whonchee Lee, Boise, ID (US); Scott G. Meikle, Boise, ID (US); Scott E. Moore, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 370 days.

(21) Appl. No.: 09/888,002

(22) Filed: Jun. 21, 2001

(65) Prior Publication Data

US 2002/0025760 A1    Feb. 28, 2002

Related U.S. Application Data

(63) Continuation-in-part of application No. 09/651,779, filed on Aug. 30, 2000.

(51) Int. Cl.
*B24B 1/00* (2006.01)

(52) U.S. Cl. .............................. 451/41; 451/36; 451/59
(58) Field of Classification Search ................. 451/41, 451/285–289, 36, 59, 28; 438/692, 693; 205/652, 656, 658, 659, 671
See application file for complete search history.

(56) References Cited

U.S. PATENT DOCUMENTS

| | | | |
|---|---|---|---|
| 2,315,695 A | 4/1943 | Faust | |
| 2,516,105 A | 7/1950 | der Mateosian | |
| 3,239,439 A | 3/1966 | Helmke | |
| 3,334,210 A | 8/1967 | Williams et al. | |
| 4,839,005 A * | 6/1989 | Katsumoto et al. | 205/663 |
| 5,098,533 A | 3/1992 | Duke et al. | |
| 5,162,248 A | 11/1992 | Dennison et al. | |

(Continued)

FOREIGN PATENT DOCUMENTS

EP    0459397 A2    12/1991

(Continued)

OTHER PUBLICATIONS

Seilchi Kondo, Noriyuki Sakuma, Yoshio Homma, Yasushi Goto, Naofumi Ohashi, Hizuru Yamaguchi, and Nobuo Owada, "Abrasive-Free Polishing for Copper Damascene Interconnection", *Journal of the Electrochemical Society*, 147 (10) 3907-3913 (2000).

(Continued)

*Primary Examiner*—Dung Van Nguyen
(74) *Attorney, Agent, or Firm*—Perkins Coie LLP

(57) ABSTRACT

A method and apparatus for removing conductive material from a microelectronic substrate. In one embodiment, a support member supports a microelectronic substrate relative to a material removal medium, which can include first and second electrodes and a polishing pad. One or more electrolytes are disposed between the electrodes and the microelectronic substrate to electrically link the electrodes to the microelectronic substrate. The electrodes are then coupled to a source of varying current that electrically removes the conductive material from the substrate. The microelectronic substrate and/or the electrodes can be moved relative to each other to position the electrodes relative to a selected portion of the microelectronic substrate, and/or to polish the microelectronic substrate. The material removal medium can remove gas formed during the process from the microelectronic substrate and/or the electrodes. The medium can also have different first and second electrical characteristics to provide different levels of electrical coupling to different regions of the microelectronic substrate.

51 Claims, 13 Drawing Sheets

U.S. PATENT DOCUMENTS

| | | |
|---|---|---|
| 5,244,534 A | 9/1993 | Yu et al. |
| 5,300,155 A | 4/1994 | Sandhu et al. |
| 5,344,539 A | 9/1994 | Shinogi et al. |
| 5,562,529 A | 10/1996 | Kishii et al. |
| 5,567,300 A | 10/1996 | Datta et al. |
| 5,575,885 A | 11/1996 | Hirabayashi et al. |
| 5,618,381 A | 4/1997 | Doan et al. |
| 5,624,300 A | 4/1997 | Kishii et al. |
| 5,676,587 A | 10/1997 | Landers et al. |
| 5,681,423 A | 10/1997 | Sandhu et al. |
| 5,780,358 A | 7/1998 | Zhou et al. |
| 5,807,165 A | 9/1998 | Uzoh et al. |
| 5,840,629 A | 11/1998 | Carpio |
| 5,843,818 A | 12/1998 | Joo et al. |
| 5,846,398 A | 12/1998 | Carpio |
| 5,863,307 A | 1/1999 | Zhou et al. |
| 5,888,866 A | 3/1999 | Chien |
| 5,897,375 A | 4/1999 | Watts et al. |
| 5,911,619 A | 6/1999 | Uzoh et al. |
| 5,930,699 A | 7/1999 | Bhatia |
| 5,934,980 A | 8/1999 | Koos et al. |
| 5,952,687 A | 9/1999 | Kawakubo et al. |
| 5,954,975 A | 9/1999 | Cadien et al. |
| 5,954,997 A | 9/1999 | Kaufman et al. |
| 5,972,792 A | 10/1999 | Hudson |
| 5,993,637 A | 11/1999 | Hisamatsu et al. |
| 6,001,730 A | 12/1999 | Farkas et al. |
| 6,007,695 A | 12/1999 | Knall et al. |
| 6,010,964 A | 1/2000 | Glass |
| 6,024,856 A | 2/2000 | Haydu et al. |
| 6,033,953 A | 3/2000 | Aoki et al. |
| 6,039,633 A | 3/2000 | Chopra |
| 6,046,099 A | 4/2000 | Cadien et al. |
| 6,051,496 A | 4/2000 | Jang |
| 6,060,386 A | 5/2000 | Givens |
| 6,060,395 A | 5/2000 | Skrovan et al. |
| 6,063,306 A | 5/2000 | Kaufman et al. |
| 6,066,030 A * | 5/2000 | Uzoh .................. 451/41 |
| 6,066,559 A | 5/2000 | Gonzalez et al. |
| 6,068,787 A | 5/2000 | Grumbine et al. |
| 6,083,840 A | 7/2000 | Mravic et al. |
| 6,100,197 A | 8/2000 | Hasegawa |
| 6,103,096 A | 8/2000 | Datta et al. |
| 6,103,628 A | 8/2000 | Talieh |
| 6,103,636 A | 8/2000 | Zahorik et al. |
| 6,115,233 A | 9/2000 | Seliskar et al. |
| 6,117,781 A | 9/2000 | Lukanc et al. |
| 6,121,152 A | 9/2000 | Adams et al. |
| 6,132,586 A | 10/2000 | Adams et al. |
| 6,143,155 A | 11/2000 | Adams et al. |
| 6,162,681 A | 12/2000 | Wu |
| 6,171,467 B1 | 1/2001 | Weihs et al. |
| 6,174,425 B1 | 1/2001 | Simpson et al. |
| 6,176,992 B1 | 1/2001 | Talieh |
| 6,180,947 B1 | 1/2001 | Stickel et al. |
| 6,187,651 B1 | 2/2001 | Oh |
| 6,190,494 B1 | 2/2001 | Dow |
| 6,196,899 B1 | 3/2001 | Chopra et al. |
| 6,197,182 B1 | 3/2001 | Kaufman et al. |
| 6,206,756 B1 | 3/2001 | Chopra et al. |
| 6,218,309 B1 | 4/2001 | Miller et al. |
| 6,250,994 B1 | 6/2001 | Chopra et al. |
| 6,259,128 B1 | 7/2001 | Adler et al. |
| 6,273,786 B1 | 8/2001 | Chopra et al. |
| 6,276,996 B1 | 8/2001 | Chopra |
| 6,280,581 B1 | 8/2001 | Cheng |
| 6,287,974 B1 | 9/2001 | Miller |
| 6,299,741 B1 * | 10/2001 | Sun et al. ............. 204/224 M |
| 6,303,956 B1 | 10/2001 | Sandhu et al. |
| 6,313,038 B1 | 11/2001 | Chopra et al. |
| 6,322,422 B1 | 11/2001 | Satou |
| 6,328,632 B1 | 12/2001 | Chopra |
| 6,368,184 B1 | 4/2002 | Beckage |
| 6,368,190 B1 * | 4/2002 | Easter et al. .................. 451/41 |
| 6,379,223 B1 | 4/2002 | Sun et al. |
| 6,395,607 B1 | 5/2002 | Chung |
| 6,416,647 B1 | 7/2002 | Dordi et al. |
| 6,455,370 B1 | 9/2002 | Lane |
| 6,461,911 B1 | 10/2002 | Ahn et al. |
| 6,464,855 B1 | 10/2002 | Chadda et al. |
| 6,504,247 B1 | 1/2003 | Chung |
| 6,620,037 B1 | 9/2003 | Kaufman et al. |
| 6,689,258 B1 | 2/2004 | Lansford et al. |
| 6,693,036 B1 | 2/2004 | Nogami et al. |
| 6,722,942 B1 | 4/2004 | Lansford et al. |
| 6,722,950 B1 | 4/2004 | Dabral et al. |
| 6,736,952 B1 | 5/2004 | Emesh et al. |
| 6,753,250 B1 | 6/2004 | Hill et al. |
| 6,776,693 B1 | 8/2004 | Duboust et al. |
| 6,780,772 B1 | 8/2004 | Uzoh et al. |
| 6,846,227 B1 | 1/2005 | Sato et al. |
| 6,848,970 B1 | 2/2005 | Manens et al. |
| 6,852,630 B1 | 2/2005 | Basol et al. |
| 6,867,136 B1 | 3/2005 | Basol et al. |
| 6,881,664 B1 | 4/2005 | Catabay et al. |
| 6,893,328 B1 | 5/2005 | So |
| 2001/0025976 A1 | 10/2001 | Lee |
| 2001/0036746 A1 | 11/2001 | Sato et al. |
| 2002/0025759 A1 | 2/2002 | Lee et al. |
| 2002/0025763 A1 | 2/2002 | Lee et al. |
| 2002/0052126 A1 | 5/2002 | Lee et al. |
| 2002/0070126 A1 | 6/2002 | Sato et al. |
| 2002/0104764 A1 | 8/2002 | Banerjee et al. |
| 2002/0115283 A1 | 8/2002 | Ho et al. |
| 2003/0064669 A1 | 4/2003 | Basol et al. |
| 2003/0178320 A1 | 9/2003 | Liu et al. |
| 2004/0192052 A1 | 9/2004 | Mukherjee et al. |
| 2004/0259479 A1 | 12/2004 | Sevilla |
| 2005/0059324 A1 | 3/2005 | Lee et al. |
| 2005/0133379 A1 | 6/2005 | Basol et al. |
| 2005/0173260 A1 | 8/2005 | Basol et al. |
| 2005/0178743 A1 | 8/2005 | Manens et al. |

FOREIGN PATENT DOCUMENTS

| | | |
|---|---|---|
| EP | 0459397 A3 | 12/1991 |
| EP | 1 123 956 A1 | 8/2001 |
| JP | 1-241129 A | 9/1989 |
| JP | 2001077117 A1 | 3/2001 |
| WO | WO 00/26443 A2 | 5/2000 |
| WO | WO 00/26443 A3 | 5/2000 |
| WO | WO 00/28586 A2 | 5/2000 |
| WO | WO 00/28586 A3 | 5/2000 |
| WO | WO 00/32356 A1 | 6/2000 |
| WO | WO 00/59008 A2 | 10/2000 |
| WO | WO 00/59008 A3 | 10/2000 |
| WO | WO 00/59682 A1 | 10/2000 |
| WO | WO 02/064314 A1 | 8/2002 |

OTHER PUBLICATIONS

U.S. Appl. No. 09/651,779, Moore, filed Aug. 30, 2000.
U.S. Appl. No. 09/651,808, Chopra et al., filed Aug. 30, 2000.
U.S. Appl. No. 09/653,392, Chopra et al., filed Aug. 31, 2000.
U.S. Appl. No. 10/090,869, Moore et al., filed Mar. 4, 2002.
U.S. Appl. No. 10/230,463, Lee et al., filed Aug. 29, 2002.
U.S. Appl. No. 10/230,602, Chopra, filed Aug. 29, 2002.
U.S. Appl. No. 10/230,628, Lee et al., filed Aug. 29, 2002.
U.S. Appl. No. 10/230,970, Lee et al., filed Aug. 29, 2002.
U.S. Appl. No. 10/230,972, Lee et al., filed Aug. 29, 2002.
U.S. Appl. No. 10/230,973, Lee et al., filed Aug. 29, 2002.
D'Heurle, F.M. and K.C. Park, IBM Technical Disclosure Bulletin, Electrolytic Process for Metal Pattern Generation, vol. 17, No. 1, pp. 271-272, Jun. 1974, XP-002235691, NN 7406271.

Frankenthal, R.P. and Eaton, D.H., "Electroetching of Platinum in the Titanium-Platinum-Gold Metallization on Silicon Integrated Circuits," Journal of The Electrochemical Society, vol. 123, No. 5, pp. 703-706, May 1976, Pennington, New Jersey.

Aboaf, J.A. and R.W. Broadie, IBM Technical Disclosure Bulletin, Rounding of Square-Shape Holes in Silicon Wafers, vol. 19, No. 8, Jan. 1977, XP-002235690, NN 77013042.

Bassous, E., IBM Technical Disclosure Bulletin, Low Temperature Methods for Rounding Silicon Nozzles, vol. 20, No. 2, Jul. 1977, pp. 810-811, XP-002235692, NN 7707810.

Bernhardt, A.F., R.J. Contolini; and S.T. Mayer, "Electrochemical Planarization for Multi-Level Metallization of Microcircuitry," CircuiTree, vol. 8, No. 10, pp. 38, 40, 42, 44, 46, and 48, Oct. 1995.

McGraw-Hill, "Chemical bonding," Concise Encyclopedia of Science & Technology, Fourth Edition, Sybil P. Parker, Editor in Chief, p. 367, McGraw-Hill, New York, New York, 1998.

PhysicsWorld. Hard Materials (excerpt of Superhard superlattices) [online]. S. Barnett and A. Madan, Physics World, Jan. 1998, Institute of Physics Publishing Ltd., Bristol, <URL: http://physicsweb.org/box/world/11/1/11/world-11-1-11-1>.

Huang, C.S. et al., "A Novel UV Baking Process to Improve DUV Photoresist Hardness," pp. 135-138, Proceedings of the 1999 International Symposium on VLSI Technology, Systems, and Applications: Proceedings of Technical Papers: Jun. 8-10, 1999, Taipei, Taiwan, Institute of Electrical and Electronics Engineers, Inc., Sep. 1999.

ATMI, Inc., adapted from a presentation at the Semicon West '99 Low Dielectric Materials Technology Conference, San Francisco, California, Jul. 12, 1999, pp. 13-25.

Micro Photonics, Inc. CSM Application Bulletin. Low-load Micro Scratch Tester (MST) for characterisation of thin polymer films [online]. 3 pages. Retrieved from the Internet on Jul. 25, 2002. <URL: http://www.microphotonics.com/mstABpoly.html>.

Micro Photonics, Inc. CSM Nano Hardness tester [online]. 6 pages. Retrieved from the Internet on Jul. 29, 2002. <URL: http://www.microphotonics.com/nht.html>.

PCT International Search Report, International Application No. PCT/US02/19495, Mar. 31, 2003.

PCT International Search Report, International Application No. PCT/US02/19496, Apr. 4, 2003.

U.S. Appl. No. 10/090,869, Moore et al., filed Mar. 4, 2002.

PCT Written Opinion dated Jun. 10, 2003 for PCT/US02/19495 filed Jun. 20, 2002 (7 pages).

PCT Written Opinion dated Jun. 10, 2003 for PCT/US02/19496 filed Jun. 20, 2002 (8 pages).

PCT International Search Report dated Jul. 10, 2003, for PCT/US03/06373 filed Feb. 28, 2003 (4 pages).

Juchniewicz, R. et al. "Influence of Pulsed Current of Platinised Titanium and Tantalum Anode Durability," International Congress on Metallic Corrosion, Proceedings—vol. 3, pp. 449-453, Toronto, Jun. 3-7, 1984.

U.S. Appl. No. 09/653,411, Lee et al., filed Aug. 31, 2000.

* cited by examiner

METHODS AND APPARATUS FOR ELECTRICALLY AND/OR CHEMICALLY-MECHANICALLY REMOVING CONDUCTIVE MATERIAL FROM A MICROELECTRONIC SUBSTRATE

CROSS-REFERENCE TO RELATED APPLICATIONS

This application is a continuation-in-part of U.S. application Ser. No. 09/651,779, titled "Methods and Apparatus for Removing Conductive Material From a Microelectronic Substrate," filed Aug. 30, 2000. Additionally, this application is related to U.S. application Ser. No. 09/888,084, titled "Methods and Apparatus for Electrical, Mechanical and/or Chemical Removal of Conductive Material From a Microelectronic Substrate," filed Jun. 21, 2001, and U.S. application Ser. No. 09/887,767, titled "Microelectronic Substrate Having Conductive Material With Blunt Cornered Apertures, and Associated Methods for Removing Conductive Material," filed Jun. 21, 2001. All of the U.S. patent applications listed above are incorporated herein by reference.

TECHNICAL FIELD

This invention relates to methods and apparatuses for removing conductive material from microelectronic substrates.

BACKGROUND

Microelectronic substrates and substrate assemblies typically include a semiconductor material having features, such as memory cells, that are linked with conductive lines. The conductive lines can be formed by first forming trenches or other recesses in the semiconductor material, and then overlaying a conductive material (such as a metal) in the trenches. The conductive material is then selectively removed to leave conductive lines extending from one feature in the semiconductor material to another.

Electrolytic techniques have been used to both deposit and remove metallic layers from semiconductor substrates. For example, an alternating current can be applied to a conductive layer via an intermediate electrolyte to remove portions of the layer. In one arrangement, shown in FIG. 1, a conventional apparatus 60 includes a first electrode 20a and a second electrode 20b coupled to a current source 21. The first electrode 20a is attached directly to a metallic layer 11 of a semiconductor substrate 10 and the second electrode 20b is at least partially immersed in a liquid electrolyte 31 disposed on the surface of the metallic layer 11 by moving the second electrode downwardly until it contacts the electrolyte 31. A barrier 22 protects the first electrode 20a from direct contact with the electrolyte 31. The current source 21 applies alternating current to the substrate 10 via the electrodes 20a and 20b and the electrolyte 31 to remove conductive material from the conductive layer 11. The alternating current signal can have a variety of wave forms, such as those disclosed by Frankenthal et al. in a publication entitled, "Electroetching of Platinum in the Titanium-Platinum-Gold Metallization on Silicon Integrated Circuits" (Bell Laboratories), incorporated herein in its entirety by reference.

One drawback with the arrangement shown in FIG. 1 is that it may not be possible to remove material from the conductive layer 11 in the region where the first electrode 20a is attached because the barrier 22 prevents the electrolyte 31 from contacting the substrate 10 in this region. Alternatively, if the first electrode 20a contacts the electrolyte in this region, the electrolytic process can degrade the first electrode 20a. Still a further drawback is that the electrolytic process may not uniformly remove material from the substrate 10. For example, "islands" of residual conductive material having no direct electrical connection to the first electrode 20a may develop in the conductive layer 11. The residual conductive material can interfere with the formation and/or operation of the conductive lines, and it may be difficult or impossible to remove with the electrolytic process unless the first electrode 20a is repositioned to be coupled to such "islands."

One approach to addressing some of the foregoing drawbacks is to attach a plurality of first electrodes 20a around the periphery of the substrate 10 to increase the uniformity with which the conductive material is removed. However, islands of conductive material may still remain despite the additional first electrodes 20a. Another approach is to form the electrodes 20a and 20b from an inert material, such as carbon, and remove the barrier 22 to increase the area of the conductive layer 11 in contact with the electrolyte 31. However, such inert electrodes may not be as effective as more reactive electrodes at removing the conductive material, and the inert electrodes may still leave residual conductive material on the substrate 10.

FIG. 2 shows still another approach to addressing some of the foregoing drawbacks in which two substrates 10 are partially immersed in a vessel 30 containing the electrolyte 31. The first electrode 20a is attached to one substrate 10 and the second electrode 20b is attached to the other substrate 10. An advantage of this approach is that the electrodes 20a and 20b do not contact the electrolyte. However, islands of conductive material may still remain after the electrolytic process is complete, and it may be difficult to remove conductive material from the points at which the electrodes 20a and 20b are attached to the substrates 10.

International Application PCT/US00/08336 (published as WO/00/59682) discloses an apparatus having a first chamber for applying a conductive material to a semiconductor wafer, and a second chamber for removing conductive material from the semiconductor wafer by electropolishing or chemical-mechanical polishing. The second chamber includes an anode having a paint roller configuration with a cylindrical mechanical pad that contacts both an electrolyte bath and the face of the wafer as the anode and the wafer rotate about perpendicular axes. A cathode, which can include a conductive liquid isolated from the electrolytic bath, is electrically coupled to an edge of the wafer. One drawback with this device is that it, too, can leave islands of residual conductive material on the wafer.

Another drawback with some conventional devices is that they may not adequately control gas bubbles that evolve during the electrolytic process. These bubbles can collect on the electrode and/or the microelectronic substrate and can interfere with the uniform removal of material from the substrate. Still further, conventional electrolytic processes may not provide adequate control over the rate at which material is removed from the substrate, or the location on the substrate from which the material is removed.

SUMMARY

The present invention is directed toward methods in apparatuses for removing conductive materials from microelectronic substrates. A method in accordance with one embodiment of the invention includes spacing first and second conductive electrodes apart from the microelectronic substrate. The method can further include disposing an electrolyte between the microelectronic substrate and both the first and second electrodes, with both the first and second electrodes in fluid communication with the electrolyte. At least part of the conductive material is removed from the microelectronic substrate by passing a varying current through at least one of the first and second electrodes while the electrodes are spaced apart from the conductive material of the substrate. The method can further include removing gas from a region between the microelectronic substrate and at least one of the electrodes while the conductive material is removed from the microelectronic substrate. In a further aspect of the invention, the microelectronic substrate can be engaged with a polishing surface of a polishing pad and at least one of the microelectronic substrate and the polishing pad can be moved relative to the other while the varying current is passed through the conductive material.

A method in accordance with another aspect of the invention includes aligning a first portion of the microelectronic substrate with a first portion of a material removal medium having first electrical characteristics. The method can further include aligning a second portion of the microelectronic substrate with a second portion of the material removal medium having second electrical characteristics different than the first electrical characteristics. The conductive material can be engaged with a polishing surface of the material removal medium and at least a portion of the electrically conductive material can be removed from the microelectronic substrate by passing a varying electrical current through the conductive material while engaging the conductive material with the material removal medium and moving at least one of the substrate and medium relative to the other.

The invention is also directed toward an apparatus for removing conductive material from a microelectronic substrate. In one aspect of the invention, the apparatus can include a support member having at least one engaging surface to support a microelectronic substrate. A material removal medium is positioned proximate to the support member. The material removal medium can include a first electrode and a second electrode positioned to be spaced apart from the microelectronic substrate when the microelectronic substrate is supported by the support member. At least one of the first and second electrodes is coupleable to a source of varying electrical current. The material removal medium can further include a gas removal surface positioned to remove gas from a region proximate to the microelectronic substrate and/or at least one of the first and second electrodes during operation.

In another aspect of the invention, the material removal medium can include a polishing surface positioned to engage the microelectronic substrate when the substrate is supported by the support member. At least one of the medium and the support member can be movable relative to the other and the medium can include a first region with a first electrical characteristic and a second region with a second electrical characteristic different than the first electrical characteristic. The first region can be aligned with a first portion of the microelectronic substrate and the second region can be aligned with a second portion of the microelectronic substrate when the polishing surface is engaged with the microelectronic substrate. First and second electrodes are positioned proximate to the polishing surface with at least one of the electrodes being coupleable to a source of varying electrical current.

DETAILED DESCRIPTION

The present disclosure describes methods and apparatuses for removing conductive materials from a microelectronic substrate and/or substrate assembly used in the fabrication of microelectronic devices. Many specific details of certain embodiments of the invention are set forth in the following description and in FIGS. 3–18 to provide a thorough understanding of these embodiments. One skilled in the art, however, will understand that the present invention may have additional embodiments, or that the invention may be practiced without several of the details described below.

Figure 3:
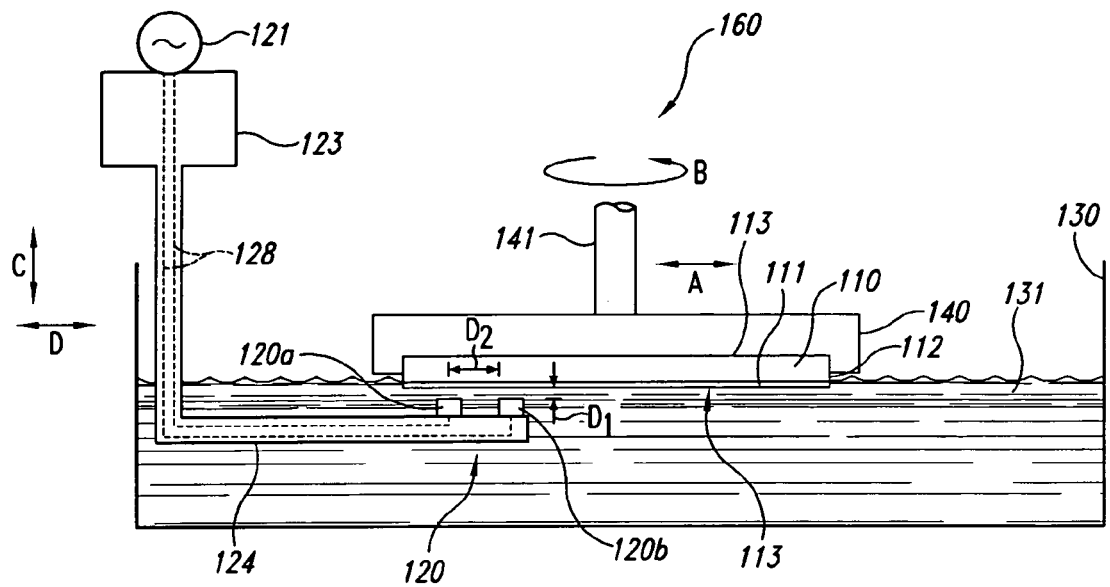
FIG. 3 is a partially schematic, side elevational view of an apparatus having a support member and a pair of electrodes for removing conductive material from a microelectronic substrate in accordance with an embodiment of the invention.

FIG. 3 is a partially schematic, side elevational view of an apparatus 160 for removing conductive material from a microelectronic substrate or substrate assembly 110 in accordance with an embodiment of the invention. In one aspect of this embodiment, the apparatus 160 includes a vessel 130 containing an electrolyte 131, which can be in a liquid or a gel state. As used herein, the terms electrolyte and electrolytic fluid refer generally to electrolytic liquids and gels. Structures in fluid communication with electrolytic fluids are accordingly in fluid communication with electrolytic liquids or gels.

The microelectronic substrate 110 has an edge surface 112 and two face surfaces 113. A support member 140 supports the microelectronic substrate 110 relative to the vessel 130 so that a conductive layer 111 on at least one of the face surfaces 113 of the substrate 110 contacts the electrolyte 131. The conductive layer 111 can include metals such as platinum, tungsten, tantalum, gold, copper, or other conductive materials. In another aspect of this embodiment, the support member 140 is coupled to a substrate drive unit 141 that moves the support member 140 and the substrate 110 relative to the vessel 130. For example, the substrate drive unit 141 can translate the support member 140 (as indicated by arrow "A") and/or rotate the support member 140 (as indicated by arrow "B").

The apparatus 160 can further include a first electrode 120a and a second electrode 120b (referred to collectively as electrodes 120) supported relative to the microelectronic substrate 110 by a support member 124. In one aspect of this embodiment, the support arm 124 is coupled to an electrode drive unit 123 for moving the electrodes 120 relative to the microelectronic substrate 110. For example, the electrode drive unit 123 can move the electrodes toward and away from the conductive layer 111 of the microelectronic substrate 110, (as indicated by arrow "C"), and/or transversely (as indicated by arrow "D") in a plane generally parallel to the conductive layer 111. Alternatively, the electrode drive unit 123 can move the electrodes in other fashions, or the electrode drive unit 123 can be eliminated when the substrate drive unit 141 provides sufficient relative motion between the substrate 110 and the electrodes 120.

In either embodiment described above with reference to FIG. 3, the electrodes 120 are coupled to a current source 121 with leads 128 for supplying electrical current to the electrolyte 131 and the conductive layer 111. In operation, the current source 121 supplies an alternating current (single phase or multiphase) to the electrodes 120. The current passes through the electrolyte 131 and reacts electrochemically with the conductive layer 111 to remove material (for example, atoms or groups of atoms) from the conductive layer 111. The electrodes 120 and/or the substrate 110 can be moved relative to each other to remove material from selected portions of the conductive layer 111, or from the entire conductive layer 111.

In one aspect of an embodiment of the apparatus 160 shown in FIG. 3, a distance $D_1$ between the electrodes 120 and the conductive layer 111 is set to be smaller than a distance $D_2$ between the first electrode 120a and the second electrode 120b. Furthermore, the electrolyte 131 generally has a higher resistance than the conductive layer 111. Accordingly, the alternating current follows the path of least resistance from the first electrode 120a, through the electrolyte 131 to the conductive layer 111 and back through the electrolyte 131 to the second electrode 120b, rather than from the first electrode 120a directly through the electrolyte 131 to the second electrode 120b. Alternatively, a low dielectric material (not shown) can be positioned between the first electrode 120a and the second electrode 120b to decouple direct electrical communication between the electrodes 120 that does not first pass through the conductive layer 111.

Figure 1:
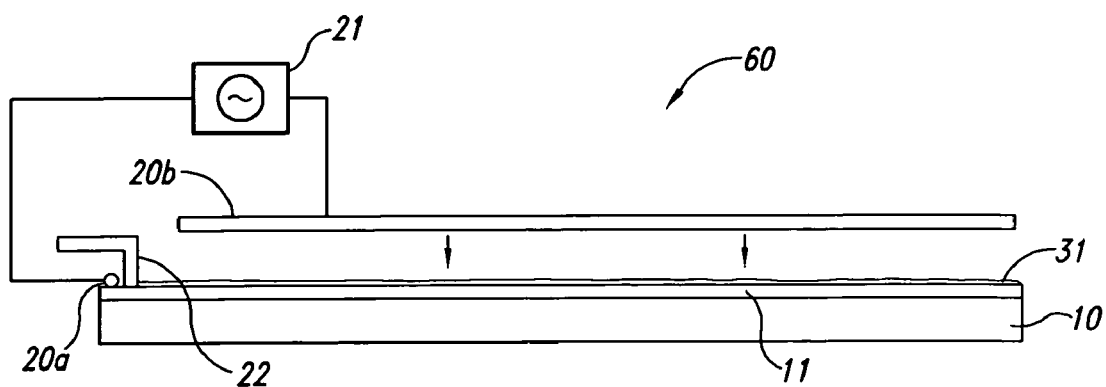
FIG. 1 is a partially schematic, side elevational view of an apparatus for removing conductive material from a semiconductor substrate in accordance with the prior art.
Figure 2:
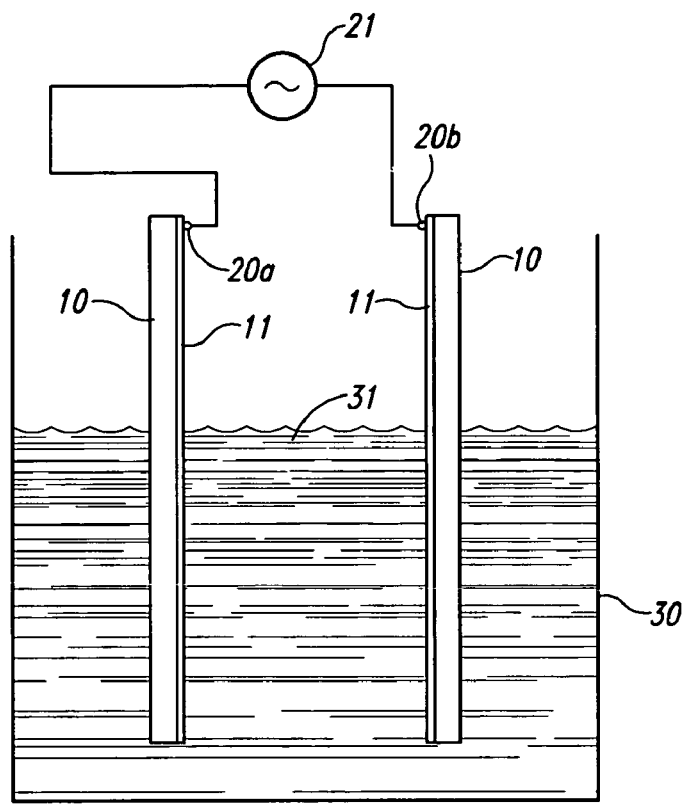
FIG. 2 is a partially schematic side, elevational view of another apparatus for removing conductive material from two semiconductor substrates in accordance with the prior art.

One feature of an embodiment of the apparatus 160 shown in FIG. 3 is that the electrodes 120 do not contact the conductive layer 111 of the substrate 110. An advantage of this arrangement is that it can eliminate the residual conductive material resulting from a direct electrical connection between the electrodes 120 and the conductive layer 111, described above with reference to FIGS. 1 and 2. For example, the apparatus 160 can eliminate residual conductive material adjacent to the contact region between the electrodes and the conductive layer because the electrodes 120 do not contact the conductive layer 111.

Another feature of an embodiment of the apparatus 160 described above with reference to FIG. 3 is that the substrate 110 and/or the electrodes 120 can move relative to the other to position the electrodes 120 at any point adjacent to the conductive layer 111. An advantage of this arrangement is that the electrodes 120 can be sequentially positioned adjacent to every portion of the conductive layer to remove material from the entire conductive layer 111. Alternatively, when it is desired to remove only selected portions of the conductive layer 111, the electrodes 120 can be moved to those selected portions, leaving the remaining portions of the conductive layer 111 intact.

Figure 4:
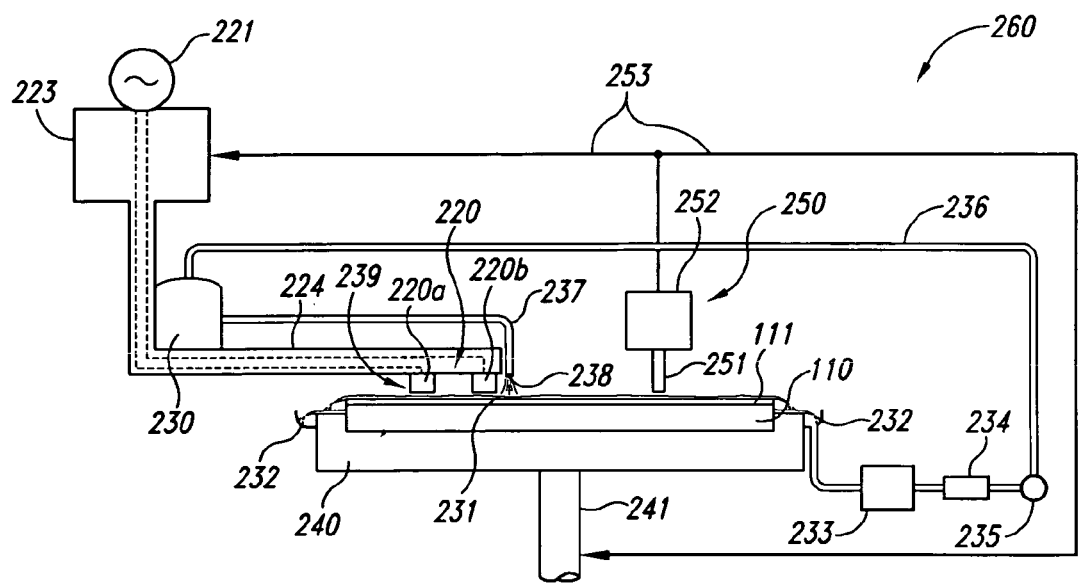
FIG. 4 is a partially schematic, side elevational view of an apparatus for removing conductive material and sensing characteristics of the microelectronic substrate from which the material is removed in accordance with another embodiment of the invention.

FIG. 4 is a partially schematic, side elevational view of an apparatus 260 that includes a support member 240 positioned to support the substrate 110 in accordance with another embodiment of the invention. In one aspect of this embodiment, the support member 240 supports the substrate 110 with the conductive layer 111 facing upwardly. A substrate drive unit 241 can move the support member 240 and the substrate 110, as described above with reference to FIG. 3. First and second electrodes 220a and 220b are positioned above the conductive layer 111 and are coupled to a current source 221. A support member 224 supports the electrodes 220 relative to the substrate 110 and is coupled to an electrode drive unit 223 to move the electrodes 220 over the surface of the support conductive layer 111 in a manner generally similar to that described above with reference to FIG. 3.

In one aspect of the embodiment shown in FIG. 4, the apparatus 260 further includes an electrolyte vessel 230 having a supply conduit 237 with an aperture 238 positioned proximate to the electrodes 220. Accordingly, an electrolyte 231 can be disposed locally in an interface region 239 between the electrodes 220 and the conductive layer 111, without necessarily covering the entire conductive layer 111. The electrolyte 231 and the conductive material removed from the conductive layer 111 flow over the substrate 110 and collect in an electrolyte receptacle 232. The mixture of electrolyte 231 and conductive material can flow to a reclaimer 233 that removes most of the conductive material from the electrolyte 231. A filter 234 positioned downstream of the reclaimer 233 provides additional filtration of the electrolyte 231 and a pump 235 returns the reconditioned electrolyte 231 to the electrolyte vessel 230 via a return line 236.

In another aspect of the embodiment shown in FIG. 4, the apparatus 260 can include a sensor assembly 250 having a sensor 251 positioned proximate to the conductive layer 111, and a sensor control unit 252 coupled to the sensor 251 for processing signals generated by the sensor 251. The control unit 252 can also move the sensor 251 relative to the substrate 110. In a further aspect of this embodiment, the sensor assembly 250 can be coupled via a feedback path 253 to the electrode drive unit 223 and/or the substrate drive unit 241. Accordingly, the sensor 251 can determine which areas of the conductive layer 111 require additional material removal and can move the electrodes 220 and/or the substrate 110 relative to each other to position the electrodes 220 over those areas. Alternatively, (for example, when the removal process is highly repeatable), the electrodes 220 and/or the substrate 110 can move relative to each other according to a predetermined motion schedule.

The sensor 251 and the sensor control unit 252 can have any of a number of suitable configurations. For example, in one embodiment, the sensor 251 can be an optical sensor that detects removal of the conductive layer 111 by detecting a change in the intensity, wavelength or phase shift of the light reflected from the substrate 110 when the conductive material is removed. Alternatively, the sensor 251 can emit and detect reflections of radiation having other wavelengths, for example, x-ray radiation. In still another embodiment, the sensor 251 can measure a change in resistance or capacitance of the conductive layer 111 between two selected points. In a further aspect of this embodiment, one or both of the electrodes 220 can perform the function of the sensor 251 (as well as the material removal function described above), eliminating the need for a separate sensor 251. In still further embodiments, the sensor 251 can detect a change in the voltage and/or current drawn from the current supply 221 as the conductive layer 111 is removed.

In any of the embodiments described above with reference to FIG. 4, the sensor 251 can be positioned apart from the electrolyte 231 because the electrolyte 231 is concentrated in the interface region 239 between the electrodes 220 and the conductive layer 111. Accordingly, the accuracy with which the sensor 251 determines the progress of the electrolytic process can be improved because the electrolyte 231 will be less likely to interfere with the operation of the sensor 251. For example, when the sensor 251 is an optical sensor, the electrolyte 231 will be less likely to distort the radiation reflected from the surface of the substrate 110 because the sensor 251 is positioned away from the interface region 239.

Another feature of an embodiment of the apparatus 260 described above with reference to FIG. 4 is that the electrolyte 231 supplied to the interface region 239 is continually replenished, either with a reconditioned electrolyte or a fresh electrolyte. An advantage of this feature is that the electrochemical reaction between the electrodes 220 and the conductive layer 111 can be maintained at a high and consistent level.

Figure 5:
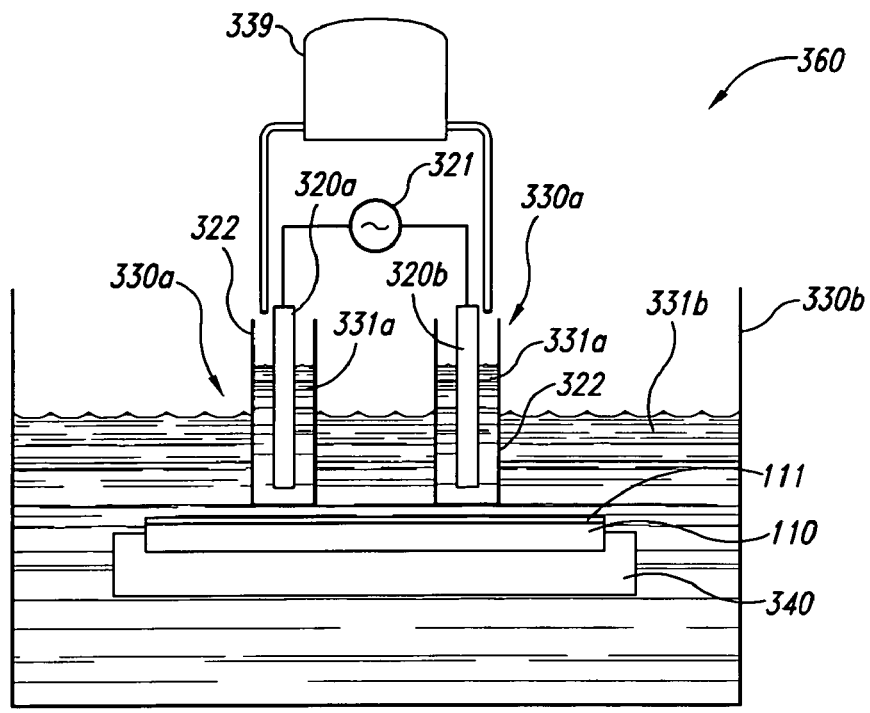
FIG. 5 is a partially schematic, side elevational view of an apparatus that includes two electrolytes in accordance with still another embodiment of the invention.

FIG. 5 is a partially schematic, side elevational view of an apparatus 360 that directs alternating current to the substrate 110 through a first electrolyte 331a and a second electrolyte 331b. In one aspect of this embodiment, the first electrolyte 331a is disposed in two first electrolyte vessels 330a, and the second electrolyte 331b is disposed in a second electrolyte vessel 330b. The first electrolyte vessels 330a are partially submerged in the second electrolyte 331b. The apparatus 360 can further include electrodes 320, shown as a first electrode 320a and a second electrode 320b, each coupled to a current supply 321 and each housed in one of the first electrolyte vessels 330a. Alternatively, one of the electrodes 320 can be coupled to ground. The electrodes 320 can include materials such as silver, platinum, copper and/or other materials, and the first electrolyte 331a can include sodium chloride, potassium chloride, copper sulfate and/or other electrolytes that are compatible with the material forming the electrodes 320.

In one aspect of this embodiment, the first electrolyte vessels 330a include a flow restrictor 322, such as a permeable isolation membrane formed from Teflon™, sintered materials such as sintered glass, quartz or sapphire, or other suitable porous materials that allow ions to pass back and forth between the first electrolyte vessels 330a and the second electrolyte vessel 330b, but do not allow the second electrolyte 330b to pass inwardly toward the electrodes 320 (for example, in a manner generally similar to a salt bridge). Alternatively, the first electrolyte 331a can be supplied to the electrode vessels 330a from a first electrolyte source 339 at a pressure and rate sufficient to direct the first electrolyte 331a outwardly through the flow restrictor 322 without allowing the first electrolyte 331a or the second electrolyte 330b to return through the flow restrictor 322. In either embodiment, the second electrolyte 331b remains electrically coupled to the electrodes 320 by the flow of the first electrolyte 331a through the restrictor 322.

In one aspect of this embodiment, the apparatus 360 can also include a support member 340 that supports the substrate 110 with the conductive layer 111 facing toward the electrodes 320. For example, the support member 340 can be positioned in the second electrolyte vessel 330b. In a further aspect of this embodiment, the support member 340 and/or the electrodes 320 can be movable relative to each other by one or more drive units (not shown).

One feature of an embodiment of the apparatus 360 described above with reference to FIG. 5 is that the first electrolyte 331a can be selected to be compatible with the electrodes 320. An advantage of this feature is that the first electrolyte 331a can be less likely than conventional electrolytes to degrade the electrodes 320. Conversely, the second electrolyte 331b can be selected without regard to the effect it has on the electrodes 320 because it is chemically isolated from the electrodes 320 by the flow restrictor 322. Accordingly, the second electrolyte 331b can include hydrochloric acid or another agent that reacts aggressively with the conductive layer 111 of the substrate 110.

Figure 6:
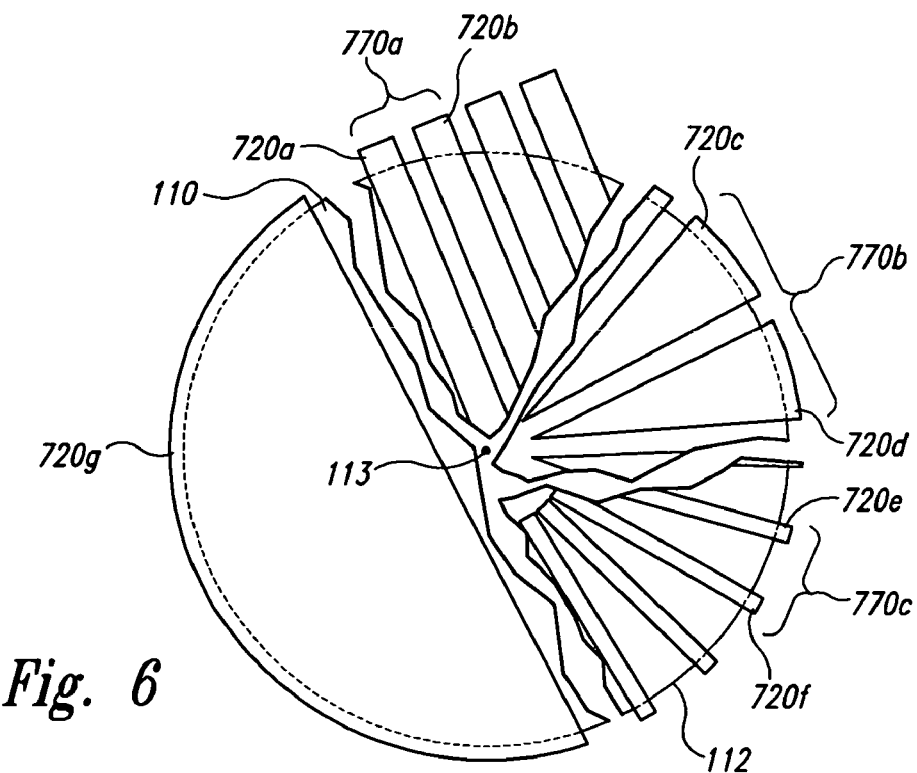
FIG. 6 is a partially schematic, plan view of a substrate adjacent to a plurality of electrodes in accordance with still further embodiments of the invention.

FIG. 6 is a top plan view of the microelectronic substrate 110 positioned beneath a plurality of electrodes having shapes and configurations in accordance with several embodiments of the invention. For purposes of illustration, several different types of electrodes are shown positioned proximate to the same microelectronic substrate 110; however, in practice, electrodes of the same type can is be positioned relative to a single microelectronic substrate 110.

In one embodiment, electrodes 720a and 720b can be grouped to form an electrode pair 770a, with each electrode 720a and 720b coupled to an opposite terminal of a current supply 121 (FIG. 3). The electrodes 770a and 770b can have an elongated or strip-type shape and can be arranged to extend parallel to each other over the diameter of the substrate 110. The spacing between adjacent electrodes of an electrode pair 370a can be selected to direct the electrical current into the substrate 110, as described above with reference to FIG. 3.

In an alternate embodiment, electrodes 720c and 720d can be grouped to form an electrode pair 770b, and each electrode 720c and 720d can have a wedge or "pie" shape that tapers inwardly toward the center of the microelectronic substrate 110. In still another embodiment, narrow, strip-type electrodes 720e and 720f can be grouped to form electrode pairs 770c, with each electrode 720e and 720f extending radially outwardly from the center 113 of the microelectronic substrate 110 toward the periphery 112 of the microelectronic substrate 110.

In still another embodiment, a single electrode 720g can extend over approximately half the area of the microelectronic substrate 110 and can have a semicircular planform shape. The electrode 720g can be grouped with another electrode (not shown) having a shape corresponding to a mirror image of the electrode 720g, and both electrodes can be coupled to the current source 121 to provide alternating current to the microelectronic substrate in any of the manners described above with reference to FIGS. 3–5.

Figure 7:
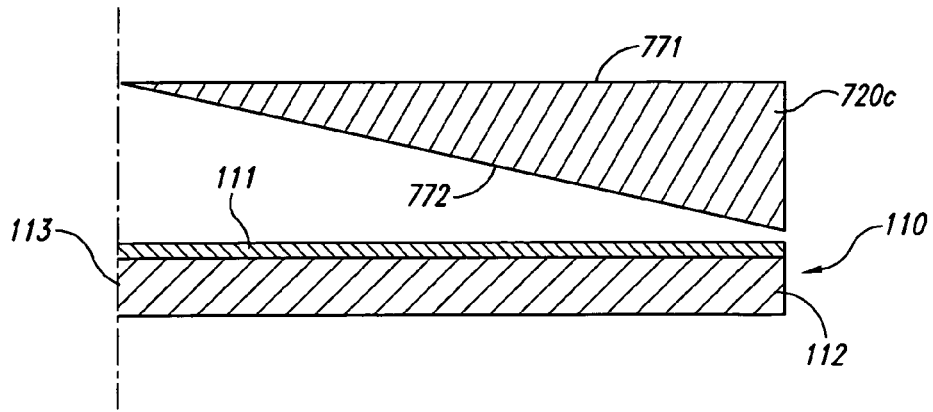
FIG. 7 is a cross-sectional, side elevational view of an electrode and a substrate in accordance with yet another embodiment of the invention.

FIG. 7 is a partially schematic, cross-sectional side elevational view of a portion of the substrate 110 positioned beneath the electrode 720c described above with reference to FIG. 6. In one aspect of this embodiment, the electrode 720c has an upper surface 771 and a lower surface 772 opposite the upper surface 771 and facing the conductive layer 111 of the substrate 110. The lower surface 772 can taper downwardly from the center 113 of the substrate 110 toward the perimeter 112 of the substrate 110 in one aspect of this embodiment to give the electrode 720c a wedge-shaped profile. Alternatively, the electrode 720c can have a plate-type configuration with the lower surface 772 positioned as shown in FIG. 7 and the upper surface 771 parallel to the lower surface 772. One feature of either embodiment is that the electrical coupling between the electrode 720c and the substrate 110 can be stronger toward the periphery 112 of the substrate 110 than toward the center 113 of the substrate 110. This feature can be advantageous when the periphery 112 of the substrate 110 moves relative to the electrode 720c at a faster rate than does the center 113 of the substrate 110, for example, when the substrate 110 rotates about its center 113. Accordingly, the electrode 720c can be shaped to account for relative motion between the electrode and the substrate 110.

In other embodiments, the electrode 720c can have other shapes. For example, the lower surface 772 can have a curved rather than a flat profile. Alternatively, any of the electrodes described above with reference to FIG. 6 (or other electrodes having shapes other than those shown in FIG. 6) can have a sloped or curved lower surface. In still further embodiments, the electrodes can have other shapes that account for relative motion between the electrodes and the substrate 110.

Figure 8A:
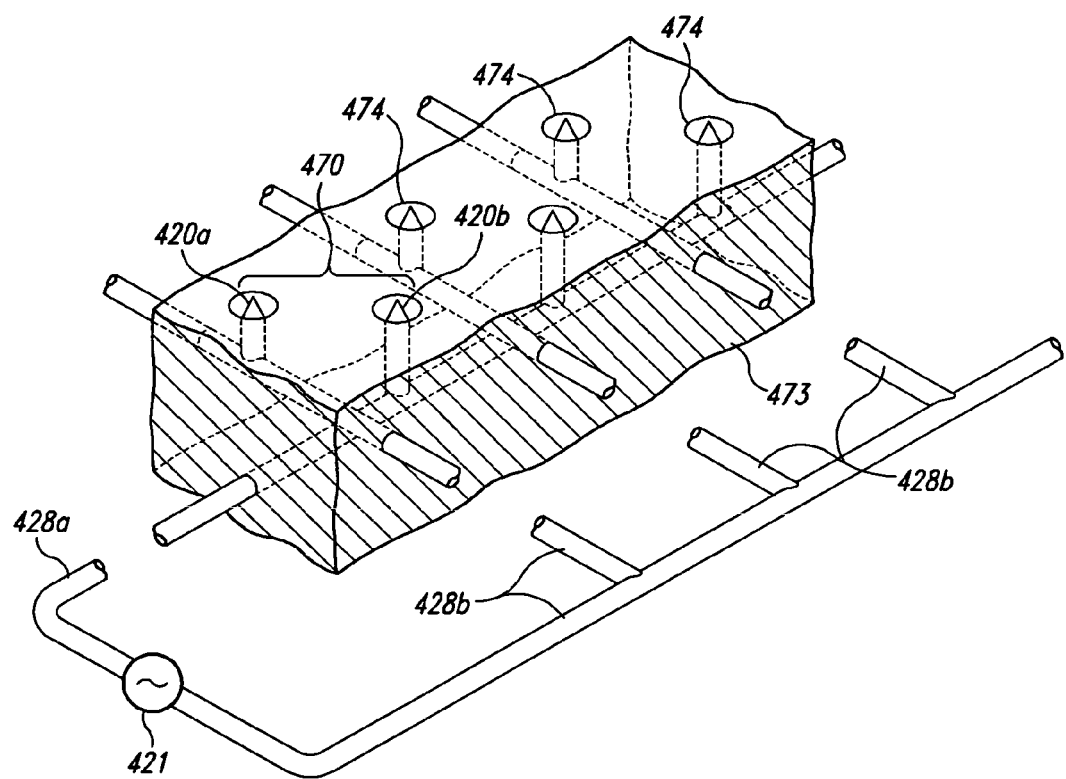
FIG. 8A is a partially schematic, isometric view of a portion of a support for housing electrode pairs in accordance with still another embodiment of the invention.

FIG. 8A is a partially schematic view of an electrode support 473 for supporting a plurality of electrodes in accordance with another embodiment of the invention. In one aspect of this embodiment, the electrode support 473 can include a plurality of electrode apertures 474, each of which houses either a first electrode 420a or a second electrode 420b. The first electrodes 420a are coupled through the apertures 474 to a first lead 428a and the second electrodes 420b are coupled to a second lead 428b. Both of the leads 428a and 428b are coupled to a current supply 421. Accordingly, each pair 470 of first and second electrodes 420a and 420b defines part of a circuit that is completed by the substrate 110 and the electrolyte(s) described above with reference to FIGS. 3–5.

In one aspect of this embodiment, the first lead 428a can be offset from the second lead 428b to reduce the likelihood for short circuits and/or capacitive coupling between the leads. In a further aspect of this embodiment, the electrode support 473 can have a configuration generally similar to any of those described above with reference to FIGS. 1–7. For example, any of the individual electrodes (e.g., 320a, 320c, 320e, or 320g) described above with reference to FIG. 6 can be replaced with an electrode support 473 having the same overall shape and including a plurality of apertures 474, each of which houses one of the first electrodes 420a or the second electrodes 420b.

In still a further aspect of this embodiment, the electrode pairs 470 shown in FIG. 8A can be arranged in a manner that corresponds to the proximity between the electrodes 420a, 420b and the microelectronic substrate 110 (FIG. 7), and/or the electrode pairs 470 can be arranged to correspond to the rate of relative motion between the electrodes 420a, 420b and the microelectronic substrate 110. For example, the electrode pairs 470 can be more heavily concentrated in the periphery 112 of the substrate 110 or other regions where the relative velocity between the electrode pairs 470 and the substrate 110 is relatively high (see FIG. 7). Accordingly, the increased concentration of electrode pairs 470 can provide an increased electrolytic current to compensate for the high relative velocity. Furthermore, the first electrode 420a and the second electrode 420b of each electrode pair 470 can be relatively close together in regions (such as the periphery 112 of the substrate 110) where the electrodes are close to the conductive layer 111 (see FIG. 7) because the close proximity to the conductive layer 111 reduces the likelihood for direct electrical coupling between the first electrode 420a and the second electrode 420b. In still a further aspect of this embodiment, the amplitude, frequency and/or waveform shape supplied to different electrode pairs 470 can vary depending on factors such as the spacing between the electrode pair 470 and the microelectronic substrate 110, and the relative velocity between the electrode pair 470 and the microelectronic substrate 110.

Figure 8B:
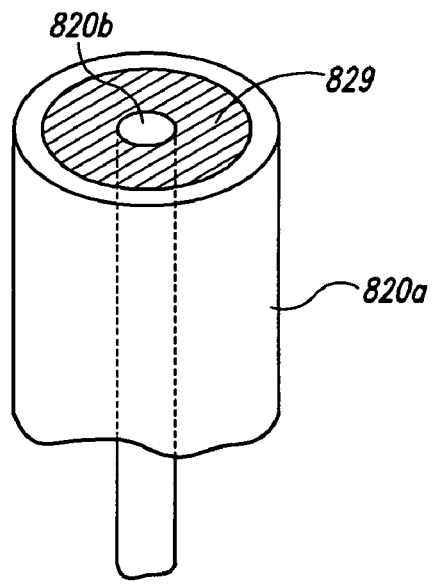
FIGS. 8B–8C are isometric views of electrodes in accordance with still further embodiments of the invention.
Figure 8C:
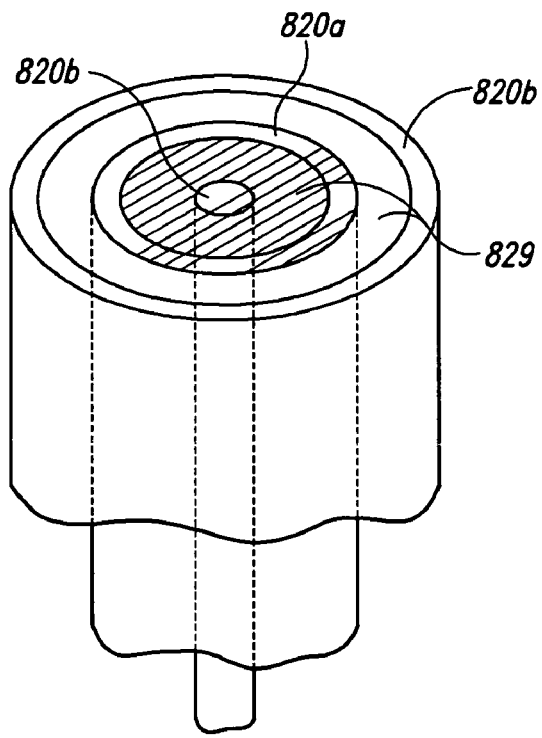

FIGS. 8B–8C illustrate electrodes 820 (shown as first electrodes 820a and second electrodes 820b) arranged concentrically in accordance with still further embodiments of the invention. In one embodiment shown in FIG. 8B, the first electrode 820a can be positioned concentrically around the second electrode 820b, and a dielectric material 829 can be disposed between the first electrode 820a and the second electrode 820b. The first electrode 820a can define a complete 360° arc around the second electrode 820b, as shown in FIG. 8B, or alternatively, the first electrode 820a can define an arc of less than 360°.

In another embodiment, shown in FIG. 8C, the first electrode 820a can be concentrically disposed between two second electrodes 820b, with the dielectric material 829 disposed between neighboring electrodes 820. In one aspect of this embodiment, current can be supplied to each of the second electrodes 820b with no phase shifting. Alternatively, the current supplied to one second electrode 820b can be phase-shifted relative to the current supplied to the other second electrode 820b. In a further aspect of the embodiment, the current supplied to each second electrode 820b can differ in characteristics other than phase, for example, amplitude.

One feature of the electrodes 820 described above with respect to FIGS. 8B–8C is that the first electrode 820a can shield the second electrode(s) 820b from interference from other current sources. For example, the first electrode 820a can be coupled to ground to shield the second electrodes 820b. An advantage of this arrangement is that the current applied to the substrate 110 (FIG. 7) via the electrodes 820 can be more accurately controlled.

Figure 9:
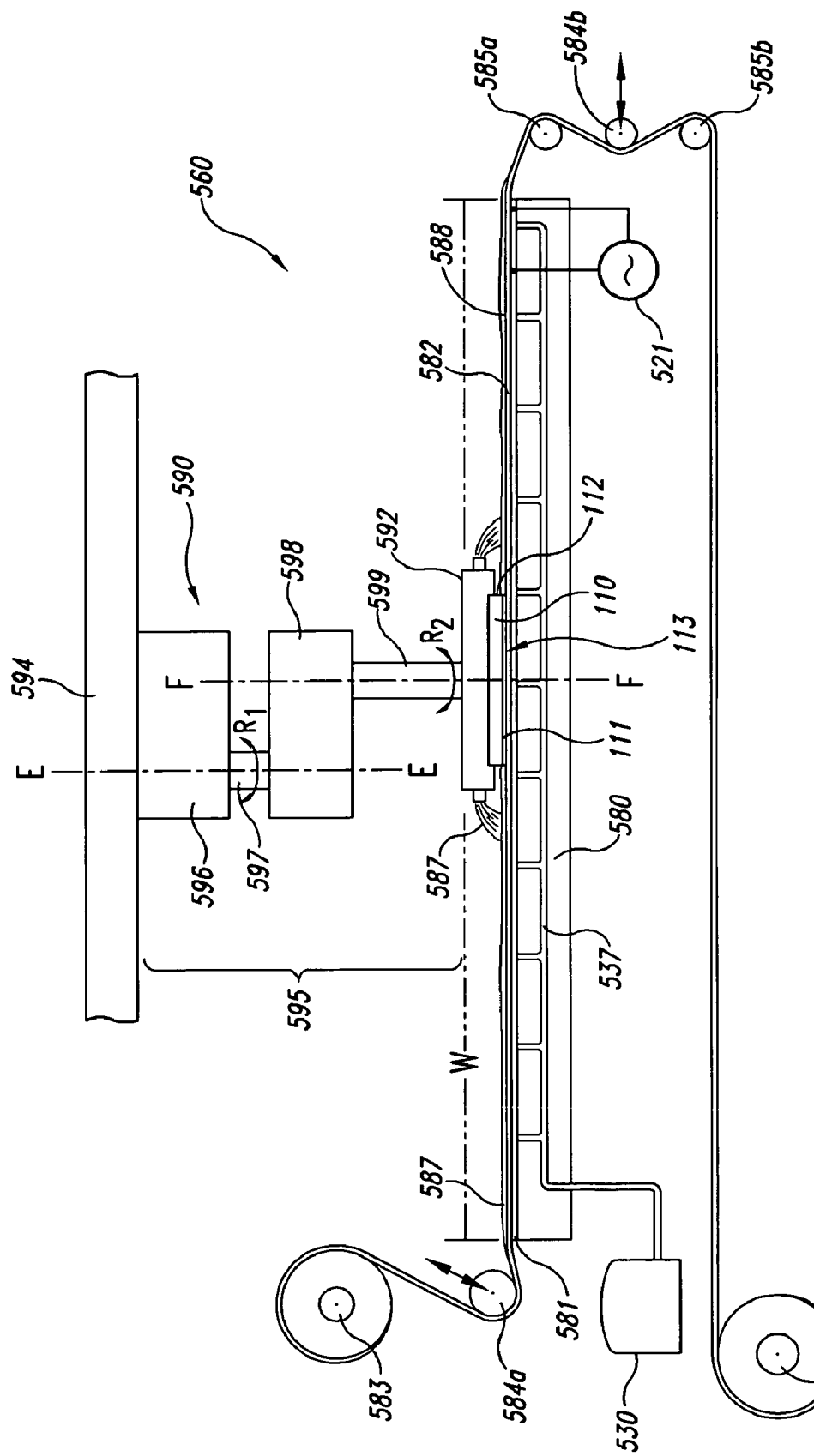
FIG. 9 is a partially schematic, side elevational view of an apparatus for both planarizing and electrolytically processing microelectronic substrates in accordance with yet another embodiment of the invention.

FIG. 9 schematically illustrates an apparatus 560 for chemically, mechanically and/or electrolytically processing the microelectronic substrate 110 in accordance with an embodiment of the invention. In one aspect of this embodiment, the apparatus 560 has a support table 580 with a top-panel 581 at a workstation where an operative portion "W" of a polishing pad 582 is positioned. The top-panel 581 is generally a rigid plate to provide a flat, solid surface to which a particular section of the polishing pad 582 may be secured during material removal processes.

The apparatus 560 can also have a plurality of rollers to guide, position and hold the polishing pad 582 over the top-panel 581. The rollers can include a supply roller 583, first and second idler rollers 584a and 584b, first and second guide rollers 585a and 585b, and a take-up roller 586. The supply roller 583 carries an unused or pre-operative portion of the polishing pad 582, and the take-up roller 583 carries a used or post-operative portion of the polishing pad 582. Additionally, the first idler roller 584a and the first guide roller 585a can stretch the polishing pad 582 over the top-panel 581 to hold the polishing pad 582 stationary during operation. A motor (not shown) drives at least one of the supply roller 583 and the take-up roller 586 to sequentially advance the polishing pad 582 across the top-panel 581. Accordingly, clean pre-operative sections of the polishing pad 582 may be quickly substituted for used sections to provide a consistent surface for polishing and/or cleaning the substrate 110.

The apparatus 560 can also have a carrier assembly 590 that controls and protects the substrate 110 during the material removal processes. The carrier assembly 590 can include a substrate holder 592 to pick up, hold and release the substrate 110 at appropriate stages of the material removal process. The carrier assembly 590 can also have a support gantry 594 carrying a drive assembly 595 that can translate along the gantry 594. The drive assembly 595 can have an actuator 596, a drive shaft 597 coupled to the actuator 596, and an arm 598 projecting from the drive shaft 597. The arm 598 carries the substrate holder 592 via a terminal shaft 599 such that the drive assembly 595 orbits the substrate holder 592 about an axis E—E (as indicated by arrow "$R_1$"). The terminal shaft 599 may also rotate the substrate holder 592 about its central axis F—F (as indicated by arrow "$R_2$").

In one embodiment, the polishing pad 582 and a planarizing solution 587 define at least a portion of a material removal medium that mechanically and/or chemically-mechanically removes material from the surface of the substrate 110. The polishing pad 582 used in the apparatus 560 can be a fixed-abrasive polishing pad having abrasive particles that are fixedly bonded to a suspension medium. Accordingly, the planarizing solution 587 can be a "clean solution" without abrasive particles because the abrasive particles are fixedly distributed across a polishing surface 588 of the polishing pad 582. In other applications, the polishing pad 582 may be a non-abrasive pad without abrasive particles, and the planarizing solution 587 can be a slurry with abrasive particles and chemicals to remove material from the substrate 110.

To remove material from the substrate 110 with the apparatus 560, the carrier assembly 590 presses the face 113 of the substrate 110 against the polishing surface 588 of the polishing pad 582 in the presence of the planarizing solution 587. The drive assembly 595 then orbits the substrate holder 592 about the axis E—E and optionally rotates the substrate holder 592 about the axis F—F to translate the substrate 110 across the planarizing surface 588. As a result, the abrasive particles and/or the chemicals in the material removal medium remove material from the surface of the substrate 110 in a chemical and/or chemical-mechanical planarization (CMP) process. Accordingly, in one embodiment, the polishing pad 582 can smooth the substrate 110 by removing rough features projecting from the conductive layer 111 of the substrate 110.

In a further aspect of this embodiment, the apparatus 560 can include an electrolyte supply vessel 530 that delivers an electrolyte to the planarizing surface 588 of the polishing pad 582 with a conduit 537, as described in greater detail with reference to FIG. 10. The apparatus 560 can further include a current supply 521 coupled to the support table 580 and/or the top-panel 581 to supply an electrical current to electrodes positioned in the support table 580 and/or the top-panel 581. Accordingly, the apparatus 560 can electrolytically remove material from the conductive layer 111 in a manner similar to that described above with reference to FIGS. 1–8C.

In one aspect of an embodiment of the apparatus 560 described above with reference to FIG. 9, material can be sequentially removed from the conductive layer 111 of the substrate 110 first by an electrolytic process and then by a CMP process. For example, the electrolytic process can remove material from the conductive layer 111 in a manner that roughens the conductive layer 111. After a selected period of electrolytic processing time has elapsed, the electrolytic processing operation can be halted and additional material can be removed via CMP processing. Alternatively, the electrolytic process and the CMP process can be conducted simultaneously. In either of these processing arrangements, one feature of an embodiment of the apparatus 560 described above with reference to FIG. 9 is that the same apparatus 560 can planarize the substrate 110 via CMP and remove material from the substrate 110 via an electrolytic process. An advantage of this arrangement is that the substrate 110 need not be moved from one apparatus to another to undergo both CMP and electrolytic processing.

Another advantage of an embodiment of the apparatus 560 described above with reference to FIG. 9 is that the processes, when used in conjunction with each other, are expected to remove material from the substrate 110 more quickly and accurately than some conventional processes. For example, as described above, the electrolytic process can remove relatively large amounts of material in a manner that roughens the microelectronic substrate 110, and the planarizing process can remove material on a finer scale in a manner that smoothes and/or flattens the microelectronic substrate 110.

Figure 10:
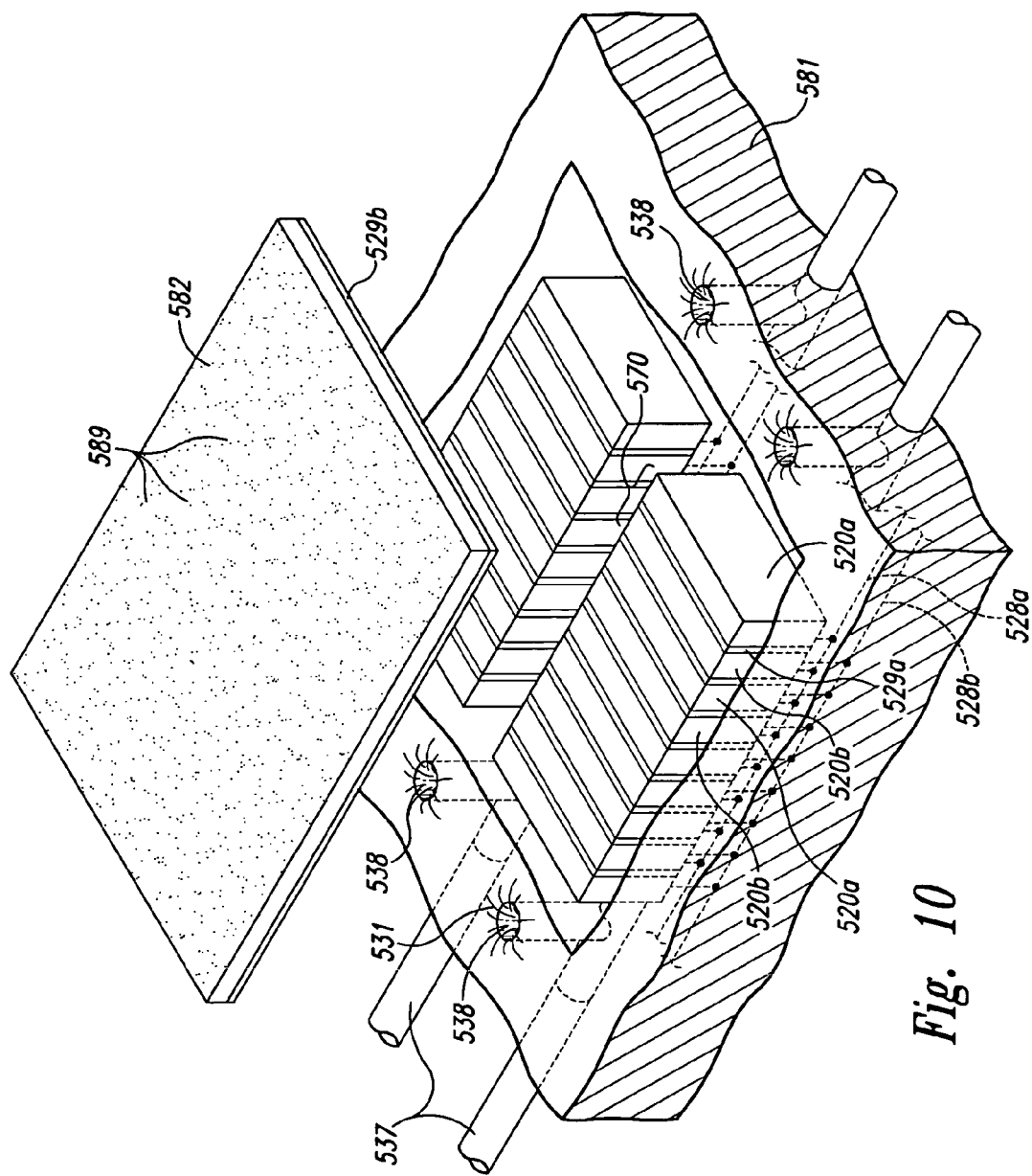
FIG. 10 is a partially schematic, partially exploded isometric view of a planarizing pad and a plurality of electrodes in accordance with still another embodiment of the invention.

FIG. 10 is a partially exploded, partially schematic isometric view of a portion of the apparatus 560 described above with reference to FIG. 9. In one aspect of an embodiment shown in FIG. 10, the top-panel 581 houses a plurality of electrode pairs 570, each of which includes a first electrode 520a and a second electrode 520b. The first electrodes 520a are coupled to a first lead 528a and the second electrodes 520b are coupled to a second lead 528b. The first and second leads 528a and 528b are coupled to the current source 521 (FIG. 9). In one aspect of this embodiment, the first electrode 520a can be separated from the second electrodes 520b by an electrode dielectric layer 529a that includes Teflon™ or another suitable dielectric material. The electrode dielectric layer 529a can accordingly control the volume and dielectric constant of the region between the first and second electrodes 520a and 520b to control electrical coupling between the electrodes.

The electrodes 520a and 520b can be electrically coupled to the microelectronic substrate 110 (FIG. 9) by the polishing pad 582. In one aspect of this embodiment, the polishing pad 582 is saturated with an electrolyte 531 supplied by the supply conduits 537 through apertures 538 in the top-panel 581 just beneath the polishing pad 582. Accordingly, the electrodes 520a and 520b are selected to be compatible with the electrolyte 531. In an alternate arrangement, the electrolyte 531 can be supplied to the polishing pad 582 from above (for example, by disposing the electrolyte 531 in the planarizing liquid 587) rather than through the top-panel 581. Accordingly, the polishing pad 582 can include a pad dielectric layer 529b positioned between the polishing pad 582 and the electrodes 520a and 520b. When the pad dielectric layer 529b is in place, the electrodes 520a and 520b are isolated from physical contact with the electrolyte 531 and can accordingly be selected from materials that are not necessarily compatible with the electrolyte 531.

In either embodiment, the electrodes 520a and 520b can be in fluid communication with each other and the conductive layer 111 via a common volume of electrolyte 531. Each electrode 520a, 520b can be more directly electrically coupled to the conductive layer 111 (FIG. 9) than to the other electrode so that electrical current passes from one electrode through the conductive layer 111 to the other electrode.

In one aspect of an embodiment of the apparatus shown in FIG. 10, the electrodes 520a and 520b face toward the face surface 113 (FIG. 9) of the microelectronic substrate 110, with the polishing pad 582 interposed between the electrodes 520a and 520b and the face surface 113. As the microelectronic substrate 110 and the electrodes 520a and 520b move relative to each other, the electrodes can electrically couple to at least a substantial portion of the face surface 113. Accordingly, the likelihood for forming electrically isolated "islands" in the conductive layer 111 (FIG. 9) at the face surface 113 can be reduced when compared to conventional devices. Alternatively, if the apparatus includes only two electrodes, each configured to face toward about one-half of the face surface 113 (in a manner generally similar to that described above with reference to electrode 220g of FIG. 6), then the electrodes can also electrically couple to at least a substantial portion of the face surface 113.

In any of the embodiments described above with reference to FIG. 10, the polishing pad 582 can provide several additional advantages over some conventional electrolytic arrangements. For example, the polishing pad 582 can uniformly separate the electrodes 520a and 520b from the microelectronic substrate 110 (FIG. 9), which can increase the uniformity with which the electrolytic process removes material from the conductive layer 111 (FIG. 9). The polishing pad 582 can also have abrasive particles 589 for planarizing the microelectronic substrate 110 in the manner described above with reference to FIG. 9. Furthermore, the polishing pad 582 can filter carbon or other material that erodes from the electrodes 520a and 520b to prevent the electrode material from contacting the microelectronic substrate 110. Still further, the polishing pad 582 can act as a sponge to retain the electrolyte 531 in close proximity to the microelectronic substrate 110.

Figure 11:
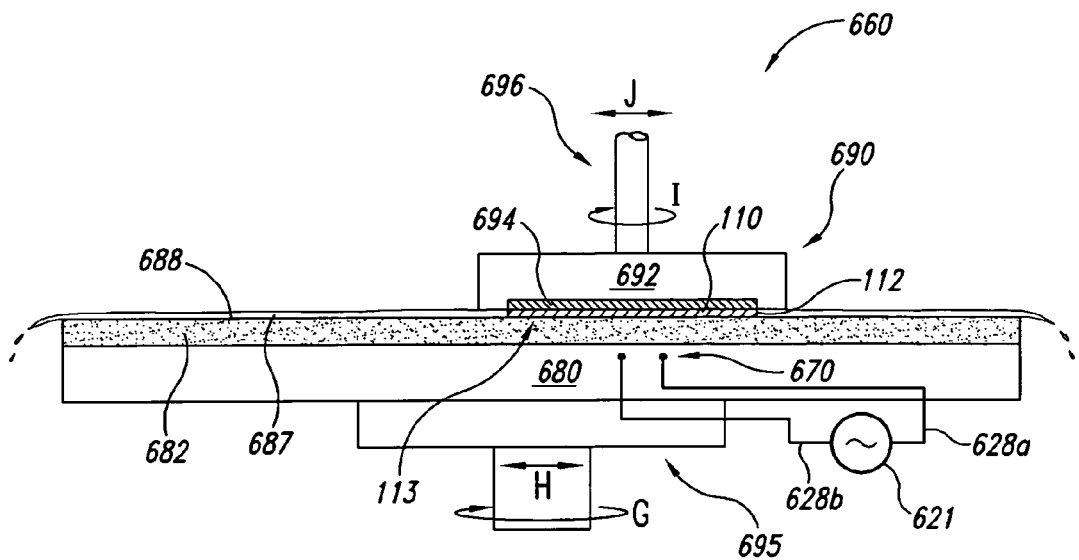
FIG. 11 is a partially schematic, side elevational view of an apparatus for both planarizing and electrolytically processing microelectronic substrates in accordance with still another embodiment of the invention.

FIG. 11 is a partially schematic, cross-sectional side elevational view of a rotary apparatus 660 for mechanically, chemically and/or electrolytically processing the microelectronic substrate 110 in accordance with another embodiment of the invention. In one aspect of this embodiment, the apparatus 660 has a generally circular platen or table 680, a carrier assembly 690, a polishing pad 682 positioned on the table 680, and a planarizing liquid 687 on the polishing pad 682. The polishing pad 682 can be a fixed abrasive polishing pad or, alternatively, the planarizing liquid 687 can be a slurry having a suspension of abrasive elements and the polishing pad 682 can be a non-abrasive pad. A drive assembly 695 rotates (arrow "G") and/or reciprocates (arrow "H") the platen 680 to move the polishing pad 682 during planarization.

The carrier assembly 690 controls and protects the microelectronic substrate 110 during the material removal process. The carrier assembly 690 typically has a substrate holder 692 with a pad 694 that holds the microelectronic substrate 110 via suction. A drive assembly 696 of the carrier assembly 690 typically rotates and/or translates the substrate holder 692 (arrows "I" and "J," respectively). Alternatively, the substrate holder 692 may include a weighted, freefloating disk (not shown) that slides over the polishing pad 682.

To planarize the microelectronic substrate 110 with the apparatus 660 in one embodiment, the carrier assembly 690 presses the microelectronic substrate 110 against a polishing surface 688 of the polishing pad 682. The platen 680 and/or the substrate holder 692 then move relative to one another to translate the microelectronic substrate 110 across the polishing surface 688. As a result, the abrasive particles in the polishing pad 682 and/or the chemicals in the planarizing liquid 687 remove material from the surface of the microelectronic substrate 110.

The apparatus 660 can also include a current source 621 coupled with leads 628a and 628b to one or more electrode pairs 670 (one of which is shown in FIG. 11). The electrode pairs 670 can be integrated with the platen 680 in generally the same manner with which the electrodes 520a and 520b (FIG. 10) are integrated with the top panel 581 (FIG. 10). Alternatively, the electrode pairs 670 can be integrated with the polishing pad 682. In either embodiment, the electrode pairs 670 can include electrodes having shapes and configurations generally similar to any of those described above with reference to FIGS. 3–10 to electrolytically remove conductive material from the microelectronic substrate 110. The electrolytic process can be carried out before, during or after the CMP process, as described above with reference to FIG. 9.

Figures 12A, 12B:
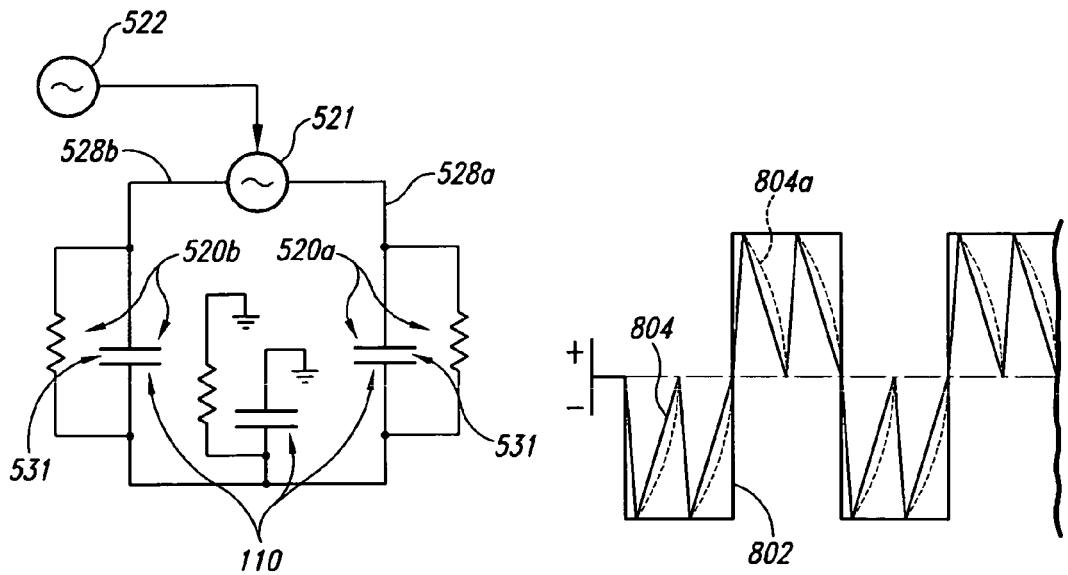
FIGS. 12A–B schematically illustrate a circuit and waveform for electrolytically processing a microelectronic substrate in accordance with yet another embodiment of the invention.

FIG. 12A is a schematic circuit representation of some of the components described above with reference to FIG. 10. The circuit analogy can also apply to any of the arrangements described above with reference to FIGS. 3–11 or below with reference to FIGS. 13–18. As shown schematically in FIG. 12A, the current source 521 is coupled to the first electrode 520a and the second electrode 520b with leads 528a and 528b, respectively. The electrodes 520a and 520b are coupled to the microelectronic substrate 110 with the electrolyte 531 in an arrangement that can be represented schematically by two sets of parallel capacitors and resistors. A third capacitor and resistor schematically indicates that the microelectronic substrate 110 "floats" relative to ground or another potential.

In one aspect of an embodiment shown in FIG. 12A, the current source 521 can be coupled to an amplitude modulator 522 that modulates the signal produced by the current source 521, as is shown in FIG. 12B. Accordingly, the current source 521 can generate a high-frequency wave 804, and the amplitude modulator 522 can superimpose a low-frequency wave 802 on the high-frequency wave 804. For example, the high-frequency wave 804 can include a series of positive or negative voltage spikes contained within a square wave envelope defined by the low-frequency wave 802. Each spike of the high-frequency wave 804 can have a relatively steep rise time slope to transfer charge through the dielectric to the electrolyte, and a more gradual fall time slope. The fall time slope can define a straight line, as indicated by high-frequency wave 804, or a curved line, as indicated by high-frequency wave 804a. In other embodiments, the high-frequency wave 804 and the low-frequency wave 802 can have other shapes depending, for example, on the particular characteristics of the dielectric material and electrolyte adjacent to the electrodes 420, the characteristics of the substrate 110, and/or the target rate at which material is to be removed from the substrate 110.

An advantage of this arrangement is that the high frequency signal can transmit the required electrical energy from the electrodes 520a and 520b to the microelectronic substrate 110, while the low frequency superimposed signal can more effectively promote the electrochemical reaction between the electrolyte 531 and the conductive layer 111 of the microelectronic substrate 110. Accordingly, any of the embodiments described above with reference to FIGS. 3–11 can include an amplitude modulator in addition to a current source.

Figure 13:
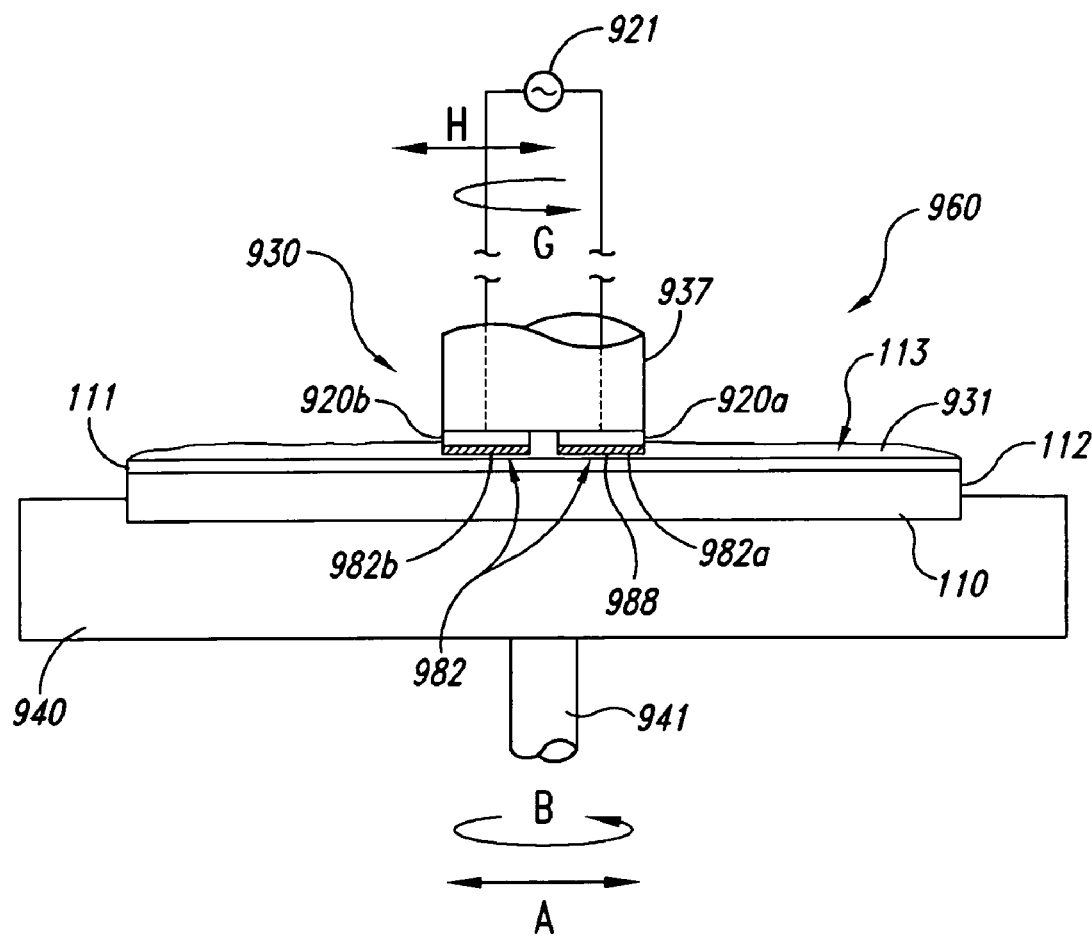
FIG. 13 is a partially schematic, side elevational view of an apparatus for both mechanically and electrolytically processing microelectronic substrates in accordance with yet another embodiment of the invention.

FIG. 13 is a partially schematic, side elevational view of an apparatus 960 for electrically, chemically and/or mechanically removing at least some of a conductive material 111 from the substrate 110. In one aspect of this embodiment, the apparatus 960 can include a support member 940 that supports the substrate 110 with the face surface 113 and the conductive layer 111 facing upwardly. In a further aspect of this embodiment, the support member 940 can include a substrate drive unit 941 that translates (as indicated by arrow "A") and/or rotates (as indicated by arrow "B") the support member 940 and the substrate 110.

The apparatus 960 can further include a material removal medium 930 that removes at least part of the conductive material 111 from the substrate 110. In one aspect of this embodiment, the material removal medium 930 can include first and second electrodes 920a, 920b supported by an electrode support 937 and coupled to an electrical potential source 921, such as an alternating current source or a pulsed direct current source. The material removal medium 930 can further include a polishing pad 982 having a first portion 982a adjacent to the first electrode 920a and a second portion 982b adjacent to the second electrode 920b. The material removal medium 930 can move relative to the support member 940 (and the microelectronic substrate 110) as indicated by arrows "H" and "G."

A fluid 931 can be disposed between the microelectronic substrate 110 and a polishing surface 988 of the polishing pad 982 to facilitate electrical and/or chemical-mechanical removal of the conductive material 111. For example, the fluid 931 can include an electrolyte that electrically couples the first and second electrodes 920a, 920b to the conductive material 111 on at least a substantial portion of the face surface 113, as was generally described above. The fluid 931 can also include chemicals and/or abrasive elements to chemically and/or mechanically remove at least some of the conductive material 111 from the substrate 110. Alternatively, the polishing pad 982 (rather than the fluid 931) can include abrasive elements. Accordingly, the combination of electrical and chemical-mechanical removal techniques in one embodiment of the apparatus 960 can provide the user with an increased level of control over the rate at which the conductive material 111 is removed from the substrate 110, the amount of conductive material 111 removed, and/or the region of the microelectronic substrate 110 from which the conductive material 111 is removed.

Figure 14A:
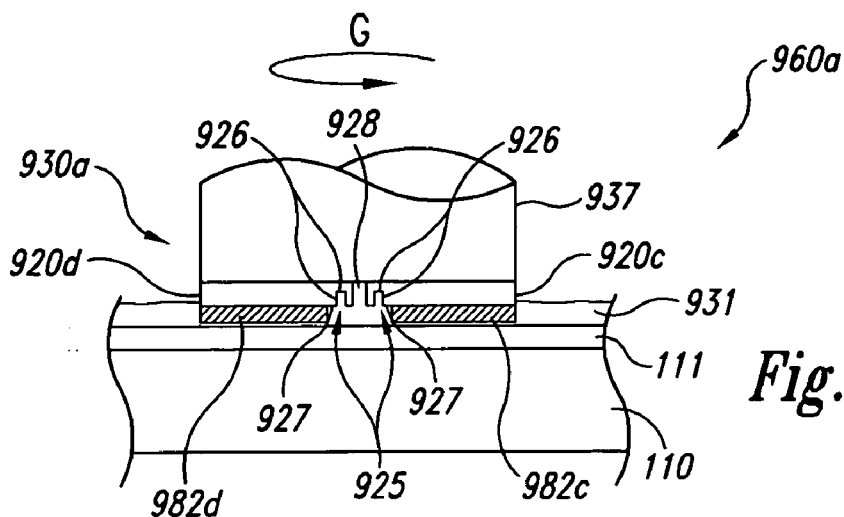
FIGS. 14A–14C schematically illustrate material removal media in accordance with still further embodiments of the invention.
Figure 14B:
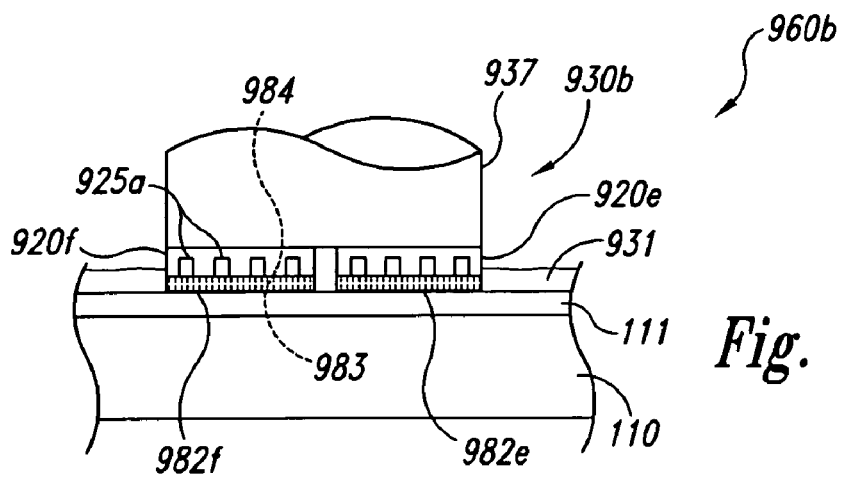
Figure 14C:
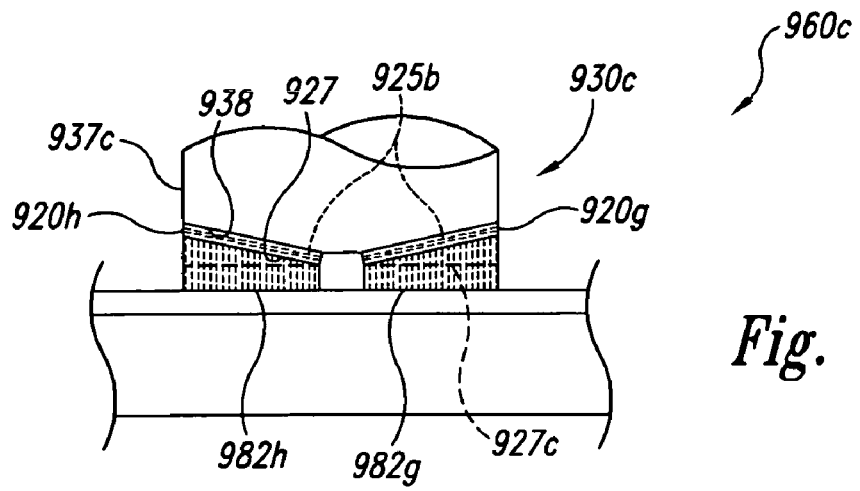

FIGS. 14A–14C illustrate apparatuses configured to receive gases generated during the electrical and/or chemical-mechanical process described above and conduct the gases away from a region proximate to the microelectronic substrate 110 and/or the electrodes. For example, an apparatus 960a shown in FIG. 14A can include a material removal medium 930a having an electrode support 937 with first and second electrodes 920c and 920d. The material removal medium 930a can further include polishing pad portions 982 (shown as a first polishing pad portion 982c adjacent the first electrode 920c, and a second polishing pad portion 982d adjacent the second electrode 920d). In one aspect of this embodiment, the polishing pad portions 982c, 982d can be generally non-porous and can cover less than the entire downwardly facing surface area of each of the electrodes 920c, 920d. Accordingly, an exposed surface 927 of each of the electrodes 920c, 920d directly faces the substrate 110. These exposed surfaces 927 can include channels 925 defined by channel surfaces 926 that can collect gas bubbles and conduct the gas bubbles away from the region proximate to the substrate 110 and/or the electrodes 920c, 920d.

In a further aspect of this embodiment, the electrodes 920c, 920d can be separated from each other by a gap 928. The gap can reduce or eliminate direct electrical coupling between the two electrodes, so that the current instead flows from one electrode through the conductive material 111 of the microelectronic substrate 110 to the other electrode. Furthermore, the gap 928 can operate in addition to, or in lieu of, the channels 925 to conduct gas bubbles away from the electrodes 920c, 920d and/or the microelectronic substrate 110. In still a further aspect of this embodiment, the electrode support 937 can rotate (as indicated by arrow "G") at a rate sufficient to move the gas bubbles radially outwardly by centrifugal force.

Another feature of the apparatus 960a shown in FIG. 14A is that the type and placement of the polishing pad portions 982c, 982d can control the electrical coupling between the electrodes 920c, 920d and the microelectronic substrate 110. For example, the polishing pad portions 982c, 982d can be generally non-porous so that only the exposed portions of the electrodes 920c, 920d are electrically coupled to the substrate 110 via the fluid 931. Alternatively, the polishing pad portions 982c, 982d can be porous or partially porous to allow some electrical coupling between the electrodes 920c, 920d and the substrate 110 in regions where the polishing pad portions 982c, 982d are interposed between the microelectronic substrate 110 and the electrodes. The degree of coupling through the polishing pad portions 982c, 982d can be less than the degree of electrical coupling between the exposed portions of the electrodes and the microelectronic substrate 110. Further examples of arrangements for controlling the electrical coupling between the electrodes and the microelectronic substrate 110 are described below with reference to FIGS. 17A–18.

FIG. 14B illustrates an apparatus 960b that includes a material removal medium 930b having first and second electrodes 920e, 920f and corresponding first and second polishing pad portions 982e, 982f. Each of the polishing pad portions 982e, 982f is porous and accordingly includes pores 983 and passages 984 extending from the pores 983 upwardly to the electrodes 920e, 920f. The electrodes 920e, 920f can include downwardly facing channels 925a in fluid communication with the passages 984. Accordingly, the passages 984 can allow gas bubbles to rise from the microelectronic substrate 110 through the polishing pad portions 982 to the channels 925a, where the gas is collected and removed. When the passages 984 are filled with the fluid 931, the passages 984 can also provide an electrical link between the electrodes 920e, 920f and the microelectronic substrate 110. The fluid 931 can either be provided directly on the surface of the microelectronic substrate 110 and then wick up through the pores 983, or alternatively, the fluid 931 can be pumped through the passages 984 from above, as will be described in greater detail below with reference to FIG. 15.

FIG. 14C illustrates an apparatus 960c having a material removal medium 930c that includes first and second electrodes 920g, 920h and corresponding first and second polishing pad portions 982g and 982h. In one aspect of this embodiment, the polishing pad portions 982g, 982h can be porous to conduct gas bubbles away from the microelectronic substrate 110, as described above with references to FIG. 14B. In another aspect of this embodiment, the electrodes 920g, 920h can include downwardly facing channels 925b positioned to collect the gas bubbles and inclined to conduct the gas bubbles away from the electrodes 920g, 920h. The material removal medium 930 can include an electrode support 937c having canted lower surfaces 938 to orient the passages 925b at a selected inclination angle. In one aspect of this embodiment, a downwardly facing surface 927 of each of the electrodes 920g, 920h is also inclined. The inclination angle can be shallow to reduce the difference in separation distance between the microelectronic substrate 110 and the electrodes at the center of the material removal medium 930c relative to the separation distance at the outer periphery of the material removal medium 930c. Alternatively, the inclination angle can be steeper to deliberately reduce the electrical coupling between the electrodes 920g, 920h and the microelectronic substrate 110 at the periphery of the material removal medium 930 and thereby control the electrical coupling between the electrodes and the microelectronic substrate. In still a further alternate embodiment, the channels 925b can be inclined upwardly (as shown in FIG. 14C), although a lower surface 927c of the electrodes 920g, 920h is horizontal, as indicated in dashed lines in FIG. 14C.

Figure 15:
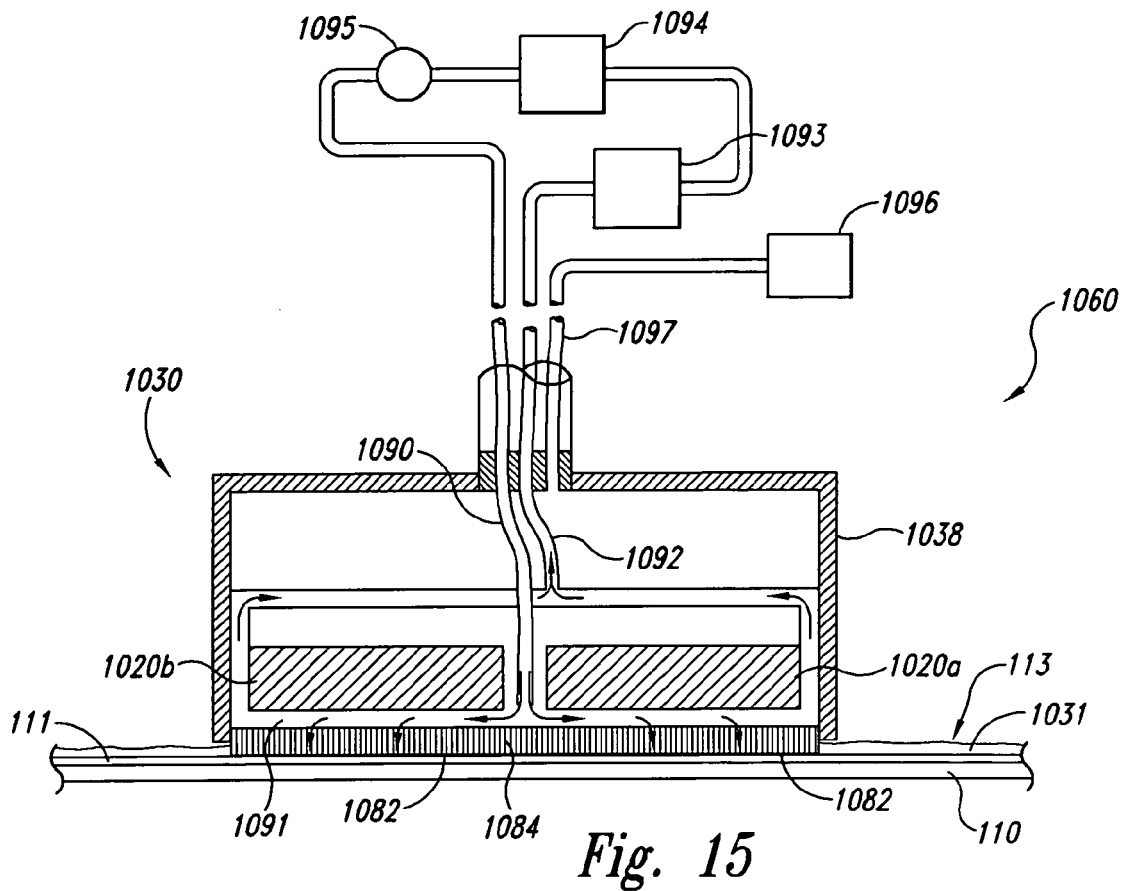
FIG. 15 is a partially schematic, side elevational view of an apparatus having a pressurized housing for both mechanically and electrolytically processing microelectronic substrates in accordance with still another embodiment of the invention.

FIG. 15 is a partially schematic, side-elevational view of an apparatus 1060 having a material removal medium 1030 that can controllably exert pressure on the microelectronic substrate 110 while recycling a portion of the process fluid and removing gas from a region proximate to the microelectronic substrate 110. For example, in one aspect of this embodiment, the material removal medium 1030 can include a pressurized housing 1038 that supports a pliable polishing pad 1082 against the microelectronic substrate 110. The housing 1038 can also support first and second electrodes 1020a and 1020b proximate to the polishing pad 1082. In one aspect of this embodiment, the apparatus 1060 can further include a pressure conduit 1097 connected between a pressure source 1096 and the housing 1038. When a pressurized fluid (such as air or another gas) is introduced into the housing 1038 via the pressure conduit 1097, it can exert a downward force on the polishing pad 1082 that can increase the rate at which material is removed from the microelectronic substrate 110. In a further aspect of this embodiment, the pressure applied to the polishing pad 1082 can be uniform over the entire extent of the polishing pad, as illustrated in FIG. 15. Alternatively, fluid at different pressures can be applied to different portions of the polishing pad 1082 to further control the mechanical removal of material from the microelectronic substrate 110.

In another aspect of an embodiment of the apparatus 1060 shown in FIG. 15, the electrodes 1020a, 1020b can be separated from the polishing pad 1082 to define a passage 1091. The passage 1091 can be coupled via a fluid supply conduit 1090 to a pump 1095 that supplies process fluid 1031 to the material removal medium 1030. In still a further aspect of this embodiment, the fluid 1031 can split into two streams, one of which "weeps" through the perforations 1084 in the polishing pad 1082, and one of which passes adjacent to the electrodes 1020a, 1020b. The fluid stream flowing adjacent to the electrodes 1020a, 1020b can cool the electrodes 1020a, 1020b. This fluid stream can also entrain and remove gas bubbles that accumulate against the downwardly facing surfaces of the electrodes 1020a, 1020b, and/or gas bubbles that may rise through the perforated polishing pad 1082. The fluid passing adjacent to the electrodes 1020a, 1020b can be collected in a return conduit 1092 and withdrawn from the housing 1038. In one aspect of this embodiment, a vacuum source 1093 can increase the rate at which the fluid 1031 is withdrawn from the housing 1038. The fluid can be treated in a recycling device 1094 that can withdraw entrained gas from the fluid 1031 and/or provide makeup fluid before returning the fluid 1031 to the pump 1095 for another cycle.

One feature of an embodiment of the apparatus described above with reference to FIG. 15 is that the pressure source 1096 can control the mechanical pressure applied by the polishing pad 1082 to the microelectronic substrate 110 and the fluid 1031 while the electrodes 1020a, 1020b control an electrochemical interaction with the conductive material 111 of the microelectronic substrate 110 with the electrodes 1020a, 1020b. In one aspect of this embodiment, the pressure applied to the polishing pad 1082 can be independent of the flow rate of the fluid 1031. Alternatively, the fluid supply conduit 1090 can pressurize the housing 1038 while at the same time supplying fluid to the polishing pad 1082 and the region between the polishing pad 1082 and the electrodes 1020a, 1020b. Accordingly, the pressure conduit 1097 and the pressure source 1096 can be eliminated in this embodiment. In either embodiment, an advantage of this arrangement is that by controlling both the mechanical pressure on the substrate 110 and the electrochemical coupling with the substrate 110, the apparatus 1060 can control the rate and manner with which the conductive material 111 is removed more precisely than can some conventional devices.

Figure 16:
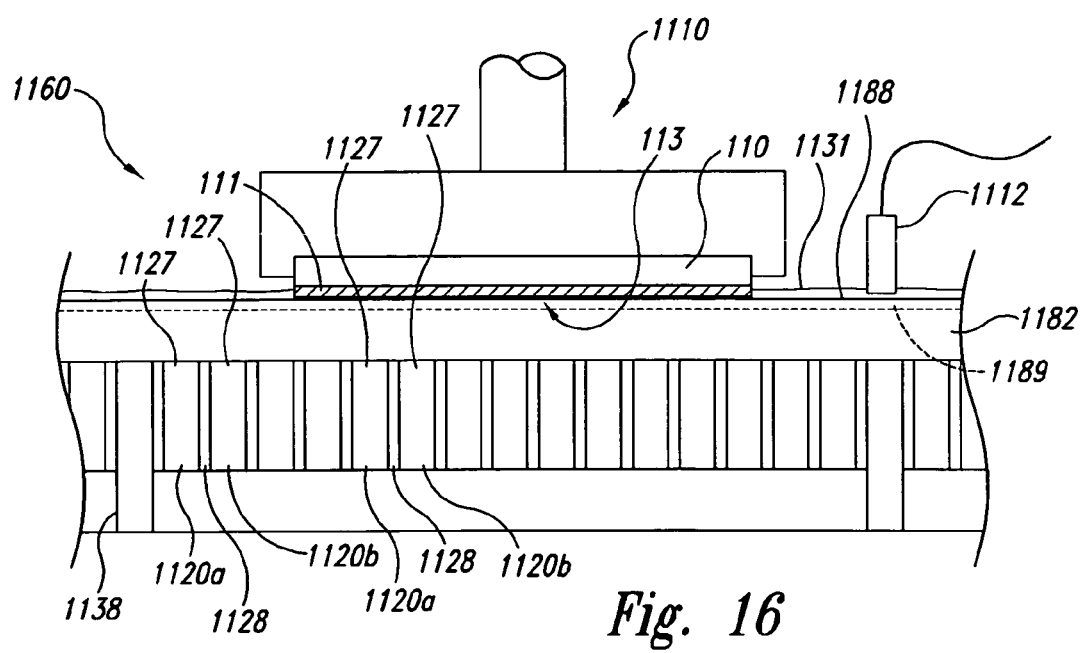
FIG. 16 is a partially schematic, side elevational view of an apparatus having an ultrasonic transducer and a polishing pad with channels for removing gas during mechanical and electrolytic processing of microelectronic substrates in accordance with another embodiment of the invention.

FIG. 16 is a partially schematic, side elevational view of an apparatus 1160 for removing conductive material 111 from the microelectronic substrate 110 in accordance with another embodiment of the invention. In one aspect of this embodiment, the apparatus 1160 can include a substrate support 1110 that supports the microelectronic substrate 110 with the conductive material 111 facing downwardly against a polishing pad 1182. A processing fluid 1131 is disposed on the polishing pad 1182 to promote removing material from the microelectronic substrate 110, as described above.

In one aspect of this embodiment, the apparatus 1160 can further include pairs of first and second electrodes 1120a, 1120b positioned beneath, and/or integrated with the polishing pad 1182. Each electrode 1120a, 1120b can have a surface 1127 facing toward the microelectronic substrate 110 and can be adjacent to a divider 1128 that electrically isolates the first electrode 1120a from the second electrode 1120b. The apparatus 1160 can further include a conduit 1138 that provides the processing fluid 1131 to the polishing pad 1182 where it can travel upwardly through pores or passages (not shown in FIG. 16) in the polishing pad 1182 to a polishing surface 1188. The polishing surface 1188 can include channels 1189 that allow gas bubbles to collect and move laterally during processing, thereby limiting the time during which the bubbles will collect against the microelectronic substrate 110 where they can reduce the efficiency of the electrical and/or chemical-mechanical material removal processes.

In a further aspect of this embodiment, the apparatus 1160 can include an ultrasonic energy emitter 1112 in fluid communication with the material removal fluid 1131. The ultrasonic energy emitter 1112 can transmit ultrasonic energy into the fluid 1131, which can increase the rate and/or efficiency with which gas bubbles are removed from the region proximate to the microelectronic substrate 110.

Figure 17A:
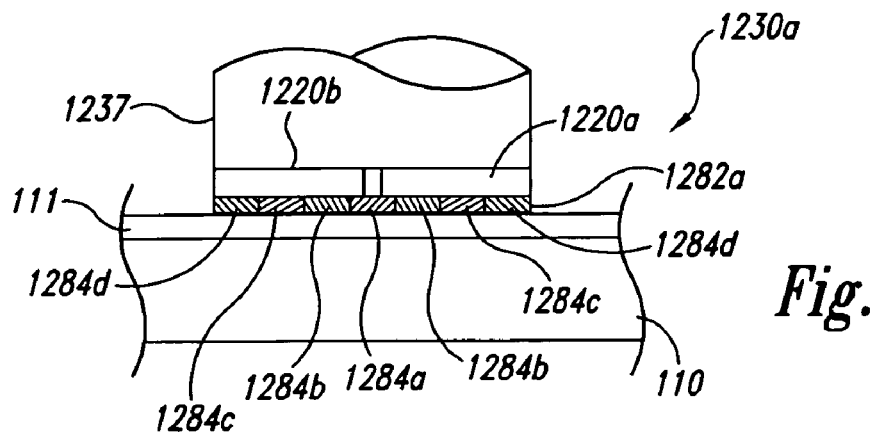
FIGS. 17A–17E schematically illustrate material removal media having spatially varying electrical characteristics in accordance with yet another embodiment of the invention.

FIGS. 17A–17E illustrate apparatuses that include material removal media having spatially varying electrical characteristics in accordance with further embodiments of the invention. FIG. 17A illustrates a material removal medium 1230a that includes an electrode support 1237 supporting a first electrode 1220a and a second electrode 1220b proximate to the microelectronic substrate 110. The material removal medium 1230a can further include a polishing pad 1282a disposed adjacent to the electrodes 1220a, 1220b. In one aspect of this embodiment, the polishing pad 1282a can include a plurality of regions 1284a-1284d, one or more of which has electrical characteristics different than those of a neighboring region. The regions 1284b–1284d can be disposed annularly about the region 1284a in one embodiment, or alternatively, the regions can have other patterns or arrangements in other embodiments. In any of these embodiments, adjacent regions 1284a–1284d can have different dielectric constants and/or conductivities to spatially vary the degree of electrical coupling between the electrodes 1220a, 1220b and the microelectronic substrate 110. Accordingly, the impedance of the circuit or circuits formed by the electrodes 1220a, 1220b and the conductive material 111 can vary over the surface of the microelectronic substrate 110, providing a variation in the rate at which material is electrically removed from the conductive material 111. Alternatively, the spatially varying electrical characteristics can correct for factors (such as varying relative velocity between the substrate 110 and the polishing pad 1282a) that would otherwise result in a spatially non-uniform material removal rate.

Figure 17B:
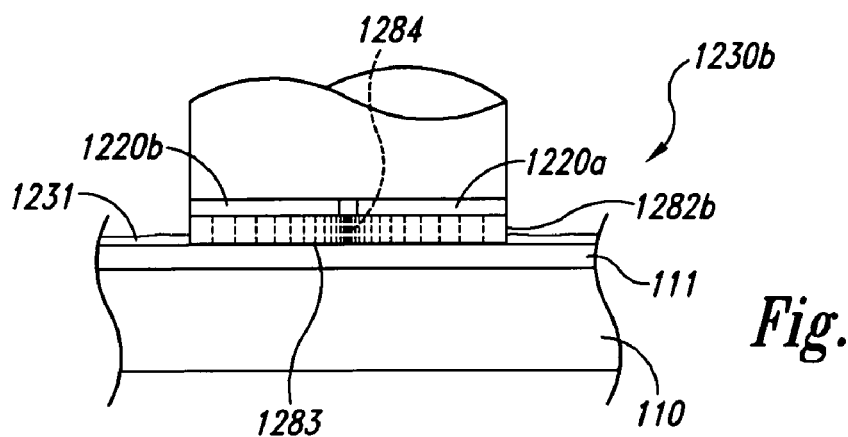

FIG. 17B illustrates a material removal medium 1230b having a porous polishing pad 1282b in accordance with another embodiment of the invention. In one aspect of this embodiment, the polishing pad 1282b can include pores 1283 and passages 1284 that provide fluid communication for a processing fluid 1231 to electrically couple the electrodes 1220a and 1220b to the conductive material 111 of the microelectronic substrate 110. In a further aspect of this embodiment, the porosity of the polishing pad 1282b can vary in a continuous manner from one region to another. For example, the porosity can decrease in a radial outward direction. In other embodiments, the porosity can change in other manners to provide a different level of electrical coupling over different portions of the microelectronic substrate 110.

Figure 17C:
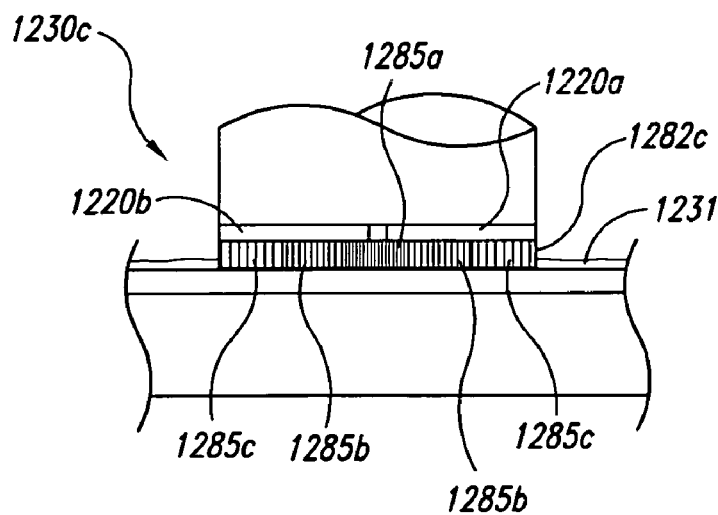

FIG. 17C illustrates a material removal medium 1230c that includes a polishing pad 1282c having three concentric regions 1285a–1285c, each with a different but constant porosity. In one aspect of this embodiment, the porosity of the polishing pad 1282c can decrease in a radial, outward direction, and in other embodiments, the porosity can change in other manners. In still further embodiments, the polishing pad 1282 can have more or fewer than three distinct regions.

Figure 17D:
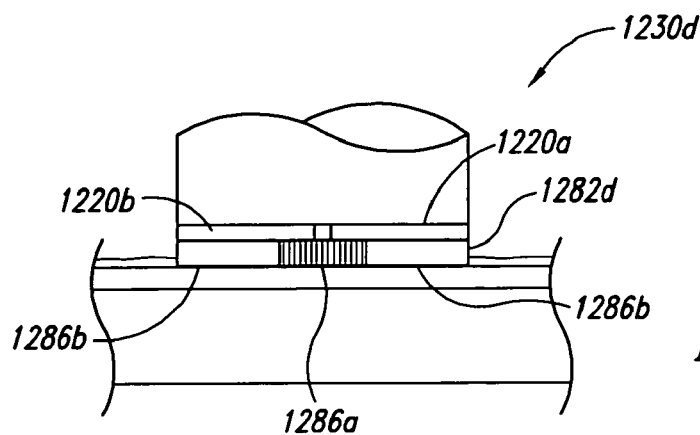
Figure 17E:
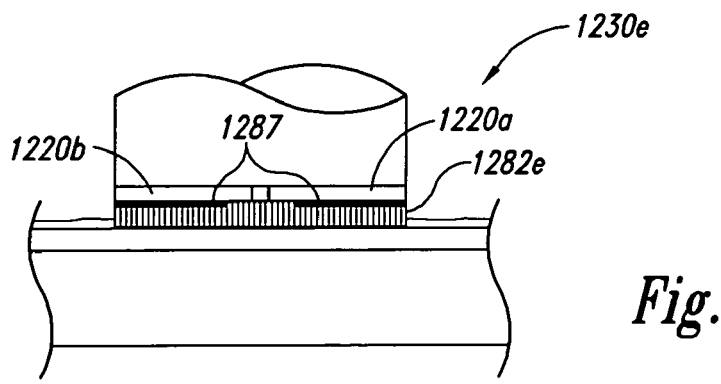

FIG. 17D illustrates a material removal medium 1230d having a polishing pad 1282d with porous and nonporous regions. For example, the polishing pad 1282d can include a porous region 1286a toward the center of the material removal medium 1230d, and a nonporous region 1286b positioned concentrically about the porous region 1286a. Accordingly, the electrodes 1220a, 1220b can be electrically coupled with the microelectronic substrate 110 only in the central region of the material removal medium 1230d, while the polishing pad 1282d can mechanically remove material over the entire contact area between the material removal medium 1230d and the substrate 110. In an alternative arrangement, shown in FIG. 17E, a material removal medium 1230e includes a polishing pad 1282e having uniform porosity. The polishing pad 1282e can be attached to a mask 1287 that precludes or at least limits electrical coupling between the electrodes 1220a, 1220b and the microelectronic substrate 110 in regions where the mask 1287 is interposed between the microelectronic substrate 110 and the polishing pad 1282e.

Figure 18:
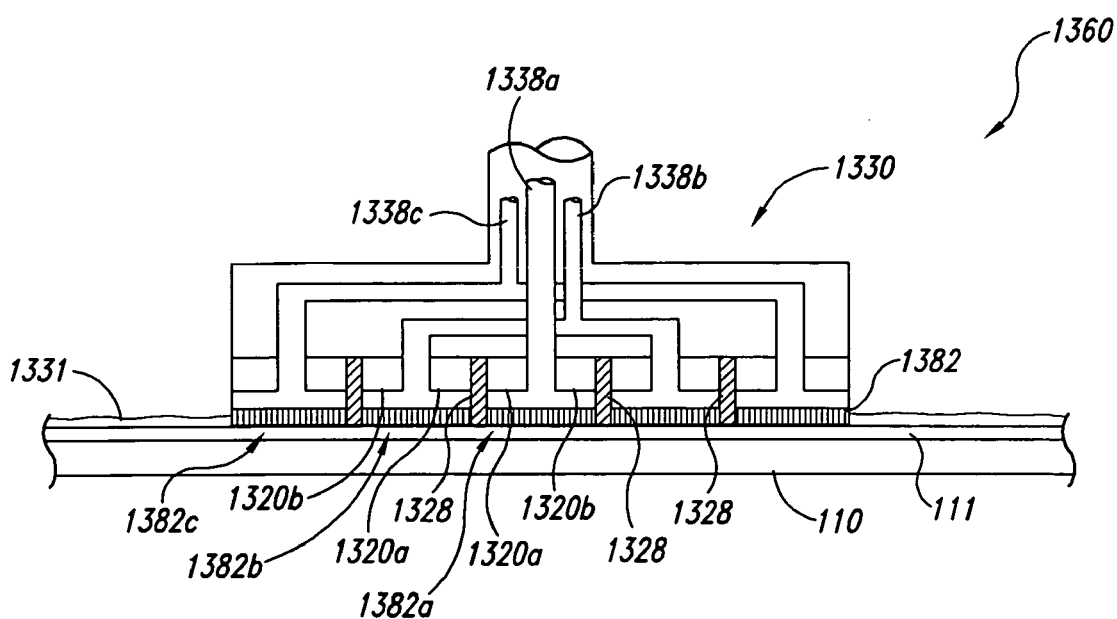
FIG. 18 is a partially schematic, side elevational view of an apparatus for delivering a plurality of electrolytic fluids during planarizing and electrolytically processing microelectronic substrates in accordance with yet another embodiment of the invention.

FIG. 18 is a partially schematic, side-elevational view of an apparatus 1360 having a material removal medium 1330 that controls electrical coupling to the microelectronic substrate 110 by disposing different electrolytic fluids over different portions of the microelectronic substrate 110. Accordingly, the material removal medium 1330 can include first, second and third electrolyte supply conduits 1338a–1338c coupled to corresponding concentric regions 1382a–1382c of the polishing pad 1382. The concentric regions 1382a–1382c can be separated by nonpermeable barriers 1328. Within each region 1382a–1382c are positioned first and second electrodes 1320a, 1320b that are electrically coupled to the conductive material 111 of the microelectronic substrate 110 via an electrolytic fluid 1331 in the pores of the polishing pad 1382.

In one aspect of this embodiment, a first electrolytic fluid supplied to the first supply conduit 1338a can be different than a second electrolytic fluid supplied to the second conduit 1338b, and both the first and second electrolytic fluids can be different than a third electrolytic fluid supplied to the third supply conduit 1338c. For example, the first, second, and third electrolytic fluids can have different chemical compositions and/or different concentrations of the same chemical agent or agents. In either embodiment, the impedance of an electrical circuit that includes the first region 1382a and the conductive material 111 can be different than the impedance of an electrical circuit that includes the second region 1382b and the conductive material 111. Accordingly, the degree to which the electrodes 1320a, 1320b are electrically coupled to the microelectronic substrate 110 can vary over the face of the microelectronic substrate 110, providing control over the rate at which material are electrically removed from the microelectronic substrate.

From the foregoing, it will be appreciated that, although specific embodiments of the invention have been described herein for purposes of illustration, various modifications may be made without deviating from the spirit and scope of the invention. For example, some or all of the techniques described above in the context of a web-format apparatus (such as the one shown in FIG. 9) can be applied was well to a rotary apparatus. The rate at which material is removed from the microelectronic substrate can be controlled by controlling characteristics of the electrical signal applied to the microelectronic substrate, the electrolytic fluid adjacent to the microelectronic substrate, and/or the polishing pad in contact with the microelectronic substrate. For example, characteristics of the electrical current can include current, voltage, waveform and/or frequency. Characteristics of the electrolytic fluid can include chemical composition, pH, and/or ionic strength. Characteristics of the polishing pad can include the pad configuration (such as shape, porosity, hardness, etc.). The rate at which material is removed can also be controlled by controlling the relative velocity and/or normal force between the polishing pad and the microelectronic substrate. Accordingly, the invention is not limited except as by the appended claims.

The invention claimed is:

1. A method for removing electrically conductive material from a face surface of a microelectronic substrate, comprising:
spacing a first conductive electrode apart from the microelectronic substrate;
spacing a second conductive electrode apart from the microelectronic substrate;
disposing an electrolyte between the microelectronic substrate and both the first and second electrodes, with both the first and second electrodes in fluid communication with the electrolyte;
removing at least part of the conductive material from the microelectronic substrate by passing a varying current from at least one of the first and second electrodes through the electrolyte to the microelectronic substrate and to the other of the first and second electrodes while the first and second electrodes are spaced apart from the conductive material of the microelectronic substrate and the first electrode and the second electrode are electrically connected to the microelectronic substrate only via the electrolyte; and
removing gas from a region between the microelectronic substrate and at least one of the first and second electrodes while the conductive material is removed from the microelectronic substrate.

2. The method of claim 1, further comprising:
interposing a polishing pad having a polishing surface between the face surface of the microelectronic substrate and both the first and second electrodes; and
electrically coupling the electrodes to the face surface of the microelectronic substrate through the polishing pad, with one of the electrodes defining an anode and the other electrode defining a cathode.

3. The method of claim 1 wherein removing the conductive material includes oxidizing the conductive material by passing the varying current through at least one of the first and second electrodes and the conductive material, and engaging the microelectronic substrate with a polishing surface of a polishing pad while passing the varying current through at least one of the first and second electrodes.

4. The method of claim 1, further comprising:
interposing a polishing surface between the face surface of the microelectronic substrate and both the first and second electrodes; and
moving the electrodes and/or the microelectronic substrate to electrically couple the electrodes with a substantial portion of the face surface through the polishing surface, with one of the electrodes defining an anode and the other electrode defining a cathode.

5. The method of claim 1, further comprising:
interposing a polishing surface between the face surface of the microelectronic substrate and both the first and second electrodes; and
coupling the first and second electrodes to a substantial portion of the face surface through the polishing surface.

6. The method of claim 1, further comprising providing for fluid communication between the first and second electrodes proximate to the microelectronic substrate, with one of the electrodes defining an anode and the other electrode defining a cathode.

7. The method of claim 1 wherein positioning the first and second electrodes proximate to the microelectronic substrate includes positioning surfaces of the electrodes to face downwardly toward the microelectronic substrate with the first and second electrodes being spaced apart from each other to define a gas removal channel therebetween, and wherein removing the gas includes removing the gas through the gas removal channel.

8. The method of claim 1 wherein positioning the first and second electrodes proximate to the microelectronic substrate includes positioning surfaces of the electrodes to face upwardly toward the microelectronic substrate.

9. The method of claim 1 wherein positioning the first and second electrodes proximate to the microelectronic substrate includes positioning surfaces of the electrodes to face upwardly toward the microelectronic substrate, and wherein the method further comprises engaging the microelectronic substrate with a polishing surface of a polishing pad adjacent to at least one of the first and second electrodes, and further wherein removing gas includes conducting the gas through an upwardly facing channel in the polishing pad.

10. The method of claim 1 wherein removing the gas includes applying a vacuum to the region between the microelectronic substrate and at least one of the first and second electrodes.

11. The method of claim 1 wherein removing the gas includes introducing ultrasonic energy into a fluid positioned between the microelectronic substrate and at least one of the first and second electrodes.

12. The method of claim 1 wherein removing the gas includes directing a fluid into the region between the microelectronic substrate and at least one of the first and second electrodes and entraining the gas in the fluid.

13. The method of claim 1, further comprising generating the gas by passing the current through the conductive material.

14. The method of claim 1 wherein passing a varying current through the first and second electrodes includes passing an alternating current through the first and second electrodes.

15. The method of claim 1 wherein passing a varying current through the first and second electrodes includes passing a plurality of direct current pulses through the first and second electrodes.

16. The method of claim 1 wherein removing the gas from a region includes removing the gas from a region between a downwardly facing surface of the microelectronic substrate and an upwardly facing surface of at least one of the electrodes.

17. The method of claim 1 wherein removing the gas from a region includes removing the gas from a region between an upwardly facing surface of the microelectronic substrate and a downwardly facing surface of at least one of the electrodes.

18. The method of claim 1, further comprising rotating at least one of the microelectronic substrate and/or at least one of the electrodes at a rate sufficient to direct the gas radially outwardly and away from the microelectronic substrate.

19. The method of claim 1, further comprising removing the gas through a gas removal channel from a region proximate to the microelectronic substrate.

20. The method of claim 1, further comprising conducting the gas along a gas removal surface from a region proximate to the microelectronic substrate.

21. The method of claim 1 wherein the first and second electrodes each have a surface facing downwardly toward the microelectronic substrate during operation, and wherein removing the gas includes removing the gas through a gas removal channel recessed into at least one of the downwardly facing surfaces.

22. The method of claim 1 wherein the first and second electrodes each have a surface facing downwardly toward the microelectronic substrate, and wherein removing the gas includes positioning at least one of the downwardly facing surfaces at a non-horizontal orientation to conduct the gas upwardly and away from the region proximate to the microelectronic substrate.

23. The method of claim 1 wherein removing the gas includes conducting the gas through pores in a polishing pad adjacent to the microelectronic substrate.

24. The method of claim 1 wherein removing at least part of the conductive material includes removing a first portion of the conductive material, and wherein the method further comprises:
  aligning a first portion of the microelectronic substrate with a first portion of a polishing pad proximate to at least one of the electrodes and having first electrical characteristics;
  aligning a second portion of the microelectronic substrate with a second portion of the polishing pad having second electrical characteristics different than the first electrical characteristics;
  engaging the microelectronic substrate with the polishing pad; and
  moving at least one of the microelectronic substrate and the polishing pad relative to the other to remove a second portion of the conductive material.

25. A method for removing electrically conductive material from a face surface of a microelectronic substrate, comprising:
  engaging the microelectronic substrate with a polishing surface of a polishing pad;
  coupling the conductive material to a source of electrical potential;
  removing at least a portion of the conductive material from the microelectronic substrate by passing a varying current through the conductive material while moving at least one of the microelectronic substrate and the polishing pad relative to the other and while the microelectronic substrate is engaged with the polishing pad; and
  removing gas from a region between the face surface of the microelectronic substrate and an electrode facing toward the face surface of the microelectronic substrate while the conductive material is removed from the microelectronic substrate.

26. The method of claim 25 wherein the electrode is one of a first electrode and a second electrode, and wherein the method further comprises:
  disposing an electrolytic fluid adjacent to the face surface of the microelectronic substrate;
  interposing the polishing surface between the face surface and the first and second electrodes;
  coupling at least one of the first and second electrodes to the source of electrical potential; and
  electrically coupling the first and second electrodes to the face surface of the microelectronic substrate through the polishing surface of the polishing pad via the electrolytic fluid.

27. The method of claim 25, further comprising biasing the polishing surface against the microelectronic substrate with an electrolytic fluid.

28. The method of claim 25, further comprising directing a first portion of an electrolytic fluid through the polishing surface to an interface between the polishing surface and the microelectronic substrate, and removing the gas by entraining the gas with a second portion of the electrolytic fluid.

29. The method of claim 25 wherein the electrode is one of a first electrode and a second electrode and wherein the method further comprises positioning both first and second electrodes to face toward the face surface of the microelectronic substrate and coupling at least one of the electrodes to the source of electrical potential.

30. The method of claim 29 wherein engaging the microelectronic substrate with a polishing pad includes engaging a first portion of the microelectronic substrate with a first portion of the polishing pad depending from a first conductive electrode and engaging a second portion of the microelectronic substrate with a second portion of the polishing pad depending from a second conductive electrode.

31. The method of claim 25, further comprising aligning a first portion of the microelectronic substrate with a first portion of the polishing pad having first electrical characteristics and aligning a second portion of the microelectronic substrate with a second portion of the polishing pad having second electrical characteristics different than the first electrical characteristics.

32. The method of claim 25, further comprising engaging the microelectronic substrate with abrasive elements disposed in an electrolytic fluid adjacent to the face surface of the microelectronic substrate.

33. The method of claim 25, further comprising engaging the microelectronic substrate with abrasive elements fixedly attached to the polishing pad.

34. The method of claim 25, further comprising rotating at least one of the microelectronic substrate and the polishing pad relative to the other while the microelectronic substrate is engaged with the polishing pad.

35. The method of claim 25 wherein the polishing pad is elongated along an axis and wherein the method further comprises advancing the polishing pad along the axis.

36. A method for removing electrically conductive material from a face surface of a microelectronic substrate, comprising:
  engaging the microelectronic substrate with a polishing surface of a polishing pad;
  applying a pressure with an electrolytic fluid to force at least one of the polishing surface and the microelectronic substrate against the other;
  coupling the conductive material to a source of electrical potential;
  removing at least a portion of the conductive material from the microelectronic substrate by passing a varying current through the conductive material while moving at least one of the microelectronic substrate and the polishing pad relative to the other and while the microelectronic substrate is engaged with the polishing pad;

removing gas from a region adjacent to the microelectronic substrate and/or an electrode at least proximate to the microelectronic substrate while the conductive material is removed from the microelectronic substrate.

37. A method for removing electrically conductive material from a face surface of a microelectronic substrate, comprising:

engaging the microelectronic substrate with a polishing surface of a polishing pad;

positioning first and second electrodes to face toward the face surface of the microelectronic substrate and coupling at least one of the electrodes to a source of electrical potential;

coupling the conductive material to the source of electrical potential;

removing at least a portion of the conductive material from the microelectronic substrate by passing a varying current through the conductive material while moving at least one of the microelectronic substrate and the polishing pad relative to the other and while the microelectronic substrate is engaged with the polishing pad; and removing gas from a region adjacent to the microelectronic substrate and/or at least one of the electrodes, with the at least one electrode at least proximate to the microelectronic substrate while the conductive material is removed from the microelectronic substrate.

38. The method of claim 37 wherein engaging the microelectronic substrate with a polishing pad includes engaging a first portion of the microelectronic substrate with a first portion of the polishing pad depending from a first conductive electrode and engaging a second portion of the microelectronic substrate with a second portion of the polishing pad depending from a second conductive electrode.

39. A method for removing electrically conductive material from a face surface of a microelectronic substrate, comprising:

engaging the microelectronic substrate with a polishing surface of a polishing pad;

aligning a first portion of the microelectronic substrate with a first portion of the polishing pad having first electrical characteristics and aligning a second portion of the microelectronic substrate with a second portion of the polishing pad having second electrical characteristics different than the first electrical characteristics;

coupling the conductive material to a source of electrical potential;

removing at least a portion of the conductive material from the microelectronic substrate by passing a varying current through the conductive material while moving at least one of the microelectronic substrate and the polishing pad relative to the other and while the microelectronic substrate is engaged with the polishing pad;

removing gas from a region adjacent to the microelectronic substrate and/or an electrode at least proximate to the microelectronic substrate while the conductive material is removed from the microelectronic substrate.

40. A method for removing electrically conductive material from a face surface of a microelectronic substrate, comprising:

spacing a first conductive electrode apart from the microelectronic substrate;

spacing a second conductive electrode apart from the microelectronic substrate;

interposing a polishing pad having a polishing surface between the face surface of the microelectronic substrate and both the first and second electrodes;

disposing an electrolyte between the microelectronic substrate and both the first and second electrodes, with both the first and second electrodes in fluid communication with the electrolyte;

electrically coupling the electrodes to the face surface of the microelectronic substrate through the polishing pad, with one of the electrodes defining an anode and the other electrode defining a cathode;

removing at least part of the conductive material from the microelectronic substrate by passing a varying current through at least one of the first and second electrodes while the first and second electrodes are spaced apart from the conductive material of the microelectronic substrate; and removing gas from a region between the microelectronic substrate and at least one of the first and second electrodes while the conductive material is removed from the microelectronic substrate.

41. A method for removing electrically conductive material from a face surface of a microelectronic substrate, comprising:

spacing a first conductive electrode apart from the microelectronic substrate;

spacing a second conductive electrode apart from the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current through at least one of the first and second electrodes while the first and second electrodes are spaced apart from the conductive material of the microelectronic substrate to oxidize the conductive material, and engaging the microelectronic substrate with a polishing surface of a polishing pad while passing the varying current through at least one of the first and second electrodes; and removing gas from a region between the microelectronic substrate and at least one of the first and second electrodes while the conductive material is removed from the microelectronic substrate.

42. A method for removing electrically conductive material from a face surface of a microelectronic substrate, comprising:

spacing a first conductive electrode apart from the microelectronic substrate;

spacing a second conductive electrode apart from the microelectronic substrate;

interposing a polishing surface between the face surface of the microelectronic substrate and both the first and second electrodes disposing an electrolyte between the microelectronic substrate and both the first and second electrodes, with both the first and second electrodes in fluid communication with the electrolyte;

coupling the first and second electrodes to a substantial portion of the face surface through the polishing surface removing at least part of the conductive material from the microelectronic substrate by passing a varying current through at least one of the first and second electrodes while the first and second electrodes are spaced apart from the conductive material of the microelectronic substrate; and removing gas from a region between the microelectronic substrate and at least one of the first and second electrodes while the conductive material is removed from the microelectronic substrate.

43. A method for removing electrically conductive material from a face surface of a microelectronic substrate, comprising:

spacing a first conductive electrode apart from the microelectronic substrate;

spacing a second conductive electrode apart from the microelectronic substrate;

positioning surfaces of the electrodes to face downwardly toward the microelectronic substrate with the first and second electrodes being spaced apart from each other to define a gas removal channel therebetween;

disposing an electrolyte between the microelectronic substrate and both the first and second electrodes, with both the first and second electrodes in fluid communication with the electrolyte;

removing at least part of the conductive material from the microelectronic substrate by passing a varying current through at least one of the first and second electrodes while the first and second electrodes are spaced apart from the conductive material of the microelectronic substrate; and removing gas from a region between the microelectronic substrate and at least one of the first and second electrodes by removing the gas through the gas removal channel while the conductive material is removed from the microelectronic substrate.

44. A method for removing electrically conductive material from a face surface of a microelectronic substrate, comprising:

spacing a first conductive electrode apart from the microelectronic substrate;

spacing a second conductive electrode apart from the microelectronic substrate;

positioning surfaces of the electrodes to face upwardly toward the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current through at least one of the first and second electrodes while the first and second electrodes are spaced apart from the conductive material of the microelectronic substrate; and removing gas from a region between the microelectronic substrate and at least one of the first and second electrodes while the conductive material is removed from the microelectronic substrate.

45. The method of claim 44 further comprising engaging the microelectronic substrate with a polishing surface of a polishing pad adjacent to at least one of the first and second electrodes, and wherein removing gas includes conducting the gas through an upwardly facing channel in the polishing pad.

46. A method for removing electrically conductive material from a face surface of a microelectronic substrate, comprising:

spacing a first conductive electrode apart from the microelectronic substrate;

spacing a second conductive electrode apart from the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current through at least one of the first and second electrodes while the first and second electrodes are spaced apart from the conductive material of the microelectronic substrate; and removing gas from a region between a downwardly facing surface of the microelectronic substrate and an upwardly facing surface of at least one of the first and second electrodes while the conductive material is removed from the microelectronic substrate.

47. A method for removing electrically conductive material from a face surface of a microelectronic substrate, comprising:

spacing a first conductive electrode apart from the microelectronic substrate;

spacing a second conductive electrode apart from the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current through at least one of the first and second electrodes while the first and second electrodes are spaced apart from the conductive material of the microelectronic substrate; and removing gas from a region between the microelectronic substrate and at least one of the first and second electrodes while the conductive material is removed from the microelectronic substrate; and rotating at least one of the microelectronic substrate and/or at least one of the electrodes at a rate sufficient to direct the gas radially outwardly and away from the microelectronic substrate.

48. A method for removing electrically conductive material from a face surface of a microelectronic substrate, comprising:

spacing a first conductive electrode apart from the microelectronic substrate, the first conductive electrode having a surface facing downwardly toward the microelectronic substrate;

spacing a second conductive electrode apart from the microelectronic substrate, the second conductive electrode having a surface facing downwardly toward the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current through at least one of the first and second electrodes while the first and second electrodes are spaced apart from the conductive material of the microelectronic substrate; and removing gas from a region between the microelectronic substrate and at least one of the first and second electrodes while the conductive material is removed from the microelectronic substrate by positioning at least one of the downwardly facing surfaces at a non-horizontal orientation to conduct the gas upwardly and away from the region proximate to the microelectronic substrate.

49. A method for removing electrically conductive material from a face surface of a microelectronic substrate, comprising:

spacing a first conductive electrode apart from the microelectronic substrate;

spacing a second conductive electrode apart from the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current through at least one of the first and second electrodes while the first and second electrodes are spaced apart from the conductive material of the microelectronic substrate; and removing gas from a region between the microelectronic substrate and at least one of the first and second electrodes by conducting the gas through pores in a polishing pad adjacent to the microelectronic substrate while the conductive material is removed from the microelectronic substrate.

50. A method for removing electrically conductive material from a face surface of a microelectronic substrate, comprising:

spacing a first conductive electrode apart from the microelectronic substrate;

spacing a second conductive electrode apart from the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current from at least one of the first and second electrodes through the electrolyte to the microelectronic substrate and to the other of the first and second electrodes while the first and second electrodes are spaced apart from the conductive material of the microelectronic substrate, and without passing the varying current through an electrical connection attached directly to the microelectronic substrate; and removing gas from a region between the microelectronic substrate and at least one of the first and second electrodes while the conductive material is removed from the microelectronic substrate.

51. A method for removing electrically conductive material from a face surface of a microelectronic substrate, comprising:

spacing a first conductive electrode apart from the microelectronic substrate;

spacing a second conductive electrode apart from the microelectronic substrate;

disposing an electrolyte between the microelectronic substrate and both the first and second electrodes, with both the first and second electrodes in fluid communication with the electrolyte;

removing at least part of the conductive material from the microelectronic substrate by passing a varying current from at least one of the first and second electrodes through the electrolyte to the microelectronic substrate and to the other of the first and second electrodes while the first and second electrodes are spaced apart from the conductive material of the microelectronic substrate, and while the first and second electrodes are at different electrical potentials than the microelectronic substrate; and removing gas from a region between the microelectronic substrate and at least one of the first and second electrodes while the conductive material is removed from the microelectronic substrate.

* * * * *